(12) United States Patent
Taki et al.

(10) Patent No.: US 11,189,289 B2
(45) Date of Patent: Nov. 30, 2021

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Yuhei Taki, Kanagawa (JP); Shinichi Kawano, Tokyo (JP); Kuniyo Oishi, Tokyo (JP); Tetsuya Asayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 165 days.

(21) Appl. No.: 16/349,731

(22) PCT Filed: Nov. 21, 2017

(86) PCT No.: PCT/JP2017/041758
§ 371 (c)(1),
(2) Date: May 14, 2019

(87) PCT Pub. No.: WO2018/105373
PCT Pub. Date: Jun. 14, 2018

(65) Prior Publication Data
US 2020/0075015 A1    Mar. 5, 2020

Related U.S. Application Data

(60) Provisional application No. 62/430,000, filed on Dec. 5, 2016.

(30) Foreign Application Priority Data

Apr. 4, 2017  (JP) .............................. JP2017-074369

(51) Int. Cl.
*G10L 15/26*    (2006.01)
*G06F 3/16*    (2006.01)
(Continued)

(52) U.S. Cl.
CPC ............. *G10L 15/26* (2013.01); *G06F 3/0484* (2013.01); *G06F 3/167* (2013.01); *G10L 15/22* (2013.01)

(58) Field of Classification Search
CPC ....... G10L 15/26; G10L 15/22; G06F 3/0484; G06F 3/167
See application file for complete search history.

(56) References Cited

U.S. PATENT DOCUMENTS 6,172,685 B1    1/2001  Pandit
8,214,209 B2*   7/2012  Nagatomo .............. G10L 15/22
                                                    704/235
(Continued)

FOREIGN PATENT DOCUMENTS

CN    103390016 A    11/2013
CN    104516876 A    4/2015
(Continued)

OTHER PUBLICATIONS

International Search Report and Written Opinion of PCT Application No. PCT/JP2017/041758, dated Jan. 16, 2018, 12 pages of ISRWO.

(Continued)

*Primary Examiner* — Mohammad K Islam
(74) *Attorney, Agent, or Firm* — Chip Law Group

(57) ABSTRACT

The present technology relates to an information processing device, an information processing method, and an information processing system that are capable of establish smooth and natural conversation with a person who has difficulty in hearing. The information processing device includes a sound acquisition unit that acquires sound information of a first user that is input to a sound input device and a display control unit that controls display of text information on a display device for a second user, the text information corresponding to the acquired sound information. The display (Continued)

control unit performs control related to display amount of the text information on the display device on the basis of at least one of the display amount of the text information on the display device or input amount of the sound information input through the sound input device.

19 Claims, 23 Drawing Sheets

(51) Int. Cl.
  *G06F 3/0484* (2013.01)
  *G10L 15/22* (2006.01)

(56) References Cited

U.S. PATENT DOCUMENTS

| | | | | |
|---|---|---|---|---|
| 8,332,220 | B2* | 12/2012 | Bodin | H04L 65/80 |
| | | | | 704/235 |
| 8,954,844 | B2* | 2/2015 | Bodin | G10L 15/22 |
| | | | | 715/255 |
| 10,649,715 | B2* | 5/2020 | Kawano | G06F 3/16 |
| 2005/0038661 | A1* | 2/2005 | Momosaki | H04N 21/4394 |
| | | | | 704/275 |
| 2009/0234648 | A1* | 9/2009 | Nagatomo | G10L 15/22 |
| | | | | 704/235 |
| 2011/0267419 | A1* | 11/2011 | Quinn | G06F 3/04842 |
| | | | | 348/14.08 |
| 2012/0299824 | A1* | 11/2012 | Hoshuyama | G06F 16/258 |
| | | | | 345/156 |
| 2013/0297308 | A1* | 11/2013 | Koo | G06F 16/164 |
| | | | | 704/235 |
| 2014/0163983 | A1* | 6/2014 | Kim | G10L 15/26 |
| | | | | 704/235 |
| 2015/0032450 | A1* | 1/2015 | Hussain | H04W 4/14 |
| | | | | 704/235 |
| 2015/0095011 | A1 | 4/2015 | Furihata et al. | |
| 2016/0011847 | A1* | 1/2016 | Choe | G06F 3/167 |
| | | | | 715/716 |
| 2016/0320966 | A1* | 11/2016 | Ryu | G06F 3/017 |
| 2017/0287355 | A1* | 10/2017 | Pogorelik | G09B 5/06 |
| 2017/0351414 | A1* | 12/2017 | Macho Cierna | G06F 1/3287 |
| 2018/0136823 | A1* | 5/2018 | Knoppert | G06F 3/1423 |
| 2018/0136824 | A1* | 5/2018 | Knoppert | G06F 3/167 |
| 2019/0019512 | A1* | 1/2019 | Taki | G06F 3/0481 |
| 2019/0026056 | A1* | 1/2019 | Wang | G06F 1/1613 |
| 2019/0088259 | A1* | 3/2019 | Yamamoto | G10L 15/26 |
| 2019/0096407 | A1* | 3/2019 | Lambourne | G11B 27/34 |
| 2019/0347332 | A1* | 11/2019 | Hiraoka | H04L 12/18 |
| 2020/0273464 | A1* | 8/2020 | Kagawa | G10L 15/30 |
| 2020/0335120 | A1* | 10/2020 | Candelore | H04N 21/4884 |
| 2020/0388284 | A1* | 12/2020 | Candelore | H04N 21/440236 |
| 2020/0401794 | A1* | 12/2020 | Ishii | G06K 9/00355 |

FOREIGN PATENT DOCUMENTS

| | | |
|---|---|---|
| JP | 09/127459 A | 5/1997 |
| JP | 09-127459 A | 5/1997 |
| JP | 2008-097104 A | 4/2008 |
| JP | 2013-235556 A | 11/2013 |
| JP | 2014-164692 A | 9/2014 |
| JP | 2015-069600 A | 4/2015 |
| WO | 2014/061388 A1 | 4/2014 |
| WO | 2016/103415 A1 | 6/2016 |

OTHER PUBLICATIONS

Office Action for JP Patent Application No. 2018-554906, dated Jul. 20, 2021, 06 pages of English Translation and 06 pages of Office Action.

* cited by examiner

FIG. 12

| ACTION REPRESENTING THAT USER HAS ALREADY READ SPEECH TEXT | DETECTION METHOD | DETERMINATION |
|---|---|---|
| SPECIFIC KEYWORD REPRESENTING USER B's UNDERSTANDING SUCH AS "YES" | SPEECH RECOGNITION | IT IS ESTIMATED THAT USER B HAS UNDERSTOOD SPEECH TEXT WHEN SPECIFIC KEYWORD HAS BEEN DETECTED |
| SPECIFIC ACTION REPRESENTING USER B's UNDERSTANDING SUCH AS "NOD" | IMAGE RECOGNITION | IT IS ESTIMATED THAT USER B HAS UNDERSTOOD SPEECH TEXT WHEN SPECIFIC ACTION HAS BEEN DETECTED PREDETERMINED NUMBER OF TIMES |
| USER B DOES NOT LOOK IN SCREEN DIRECTION FOR PREDETERMINED PERIOD OF TIME | IMAGE RECOGNITION | IT IS ESTIMATED THAT USER B HAS UNDERSTOOD SPEECH TEXT WHEN STATE WHERE USER B DOES NOT LOOK IN SCREEN DIRECTION CONTINUES PREDETERMINED PERIOD OF TIME |
| NEW SPEECH OF USER A | SPEECH RECOGNITION | IT IS DETERMINED THAT CONVERSATION PROGRESSES AND IT IS ESTIMATED THAT USER B HAS UNDERSTOOD SPEECH TEXT |

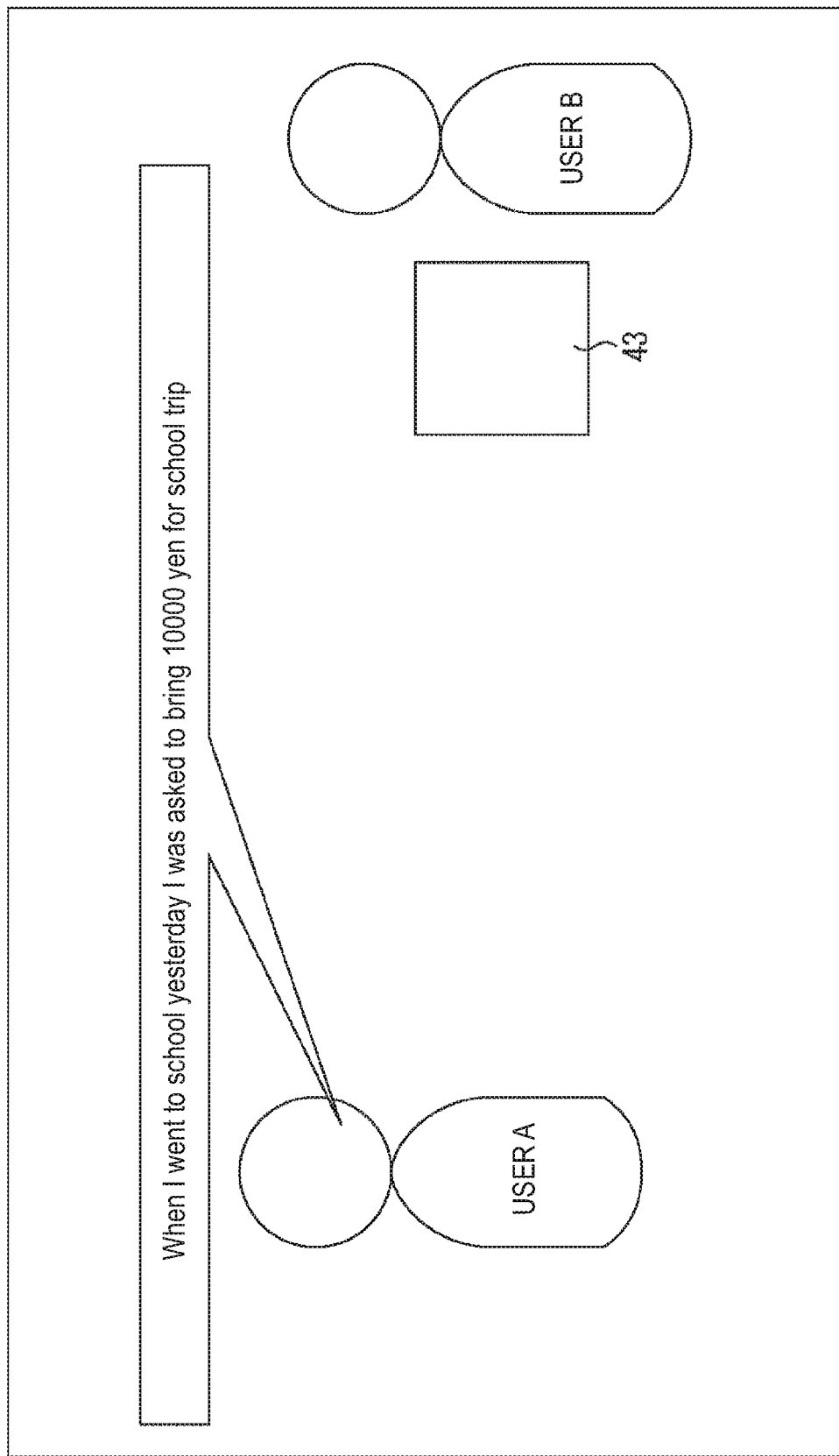

FIG. 14A

43: When I went to school yesterday I was asked to bring 10
1/2

43: 000 yen for school trip
2/2

FIG. 14B

43: When I went to school yesterday I was asked to bring
1/2

43: 10000 yen for school trip
2/2

FIG. 14C

43: went school yesterday asked bring 10000 yen school trip
1/1

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2017/041758 filed on Nov. 21, 2017, which claims priority benefit of Japanese Patent Application No. JP 2017-074369 filed in the Japan Patent Office on Apr. 4, 2017 and also claims priority benefit of U.S. Provisional Application No. U.S. 62/430,000 filed in the United States Patent Office on Dec. 5, 2016. Each of the above-referenced applications is hereby incorporated herein by reference in its entirety.

TECHNICAL FIELD

The present technology relates to an information processing device, an information processing method, and an information processing system. In particular, the present technology relates to an information processing device, an information processing method, and an information processing system that are capable of assisting natural conversation using speech recognition.

BACKGROUND ART

A technology of converting a speech of a user into a text and displaying the text on a screen has been known as a speech recognition application program using a smartphone or the like. In addition, there is a technology of summarizing a text obtained as a speech recognition result.

CITATION LIST

Patent Literature

Patent Literature 1: WO 2014-061388

DISCLOSURE OF INVENTION

Technical Problem

However, display amount of sentences obtained through text conversion is limited in the case of the speech recognition application program using a smartphone or the like. Therefore, it is desired to improve provision of communication using speech recognition.

The present technology has been made in view of the above described situations. The present technology is a technology of assisting natural conversation using speech recognition.

Solution to Problem

An information processing device of an aspect of the present technology includes: a sound acquisition unit configured to acquire sound information of a first user that is input to a sound input device; and a display control unit configured to control display of text information on a display device for a second user, the text information corresponding to the acquired sound information. The display control unit performs control related to display amount of the text information on the basis of at least one of the display amount of the text information on the display device or input amount of the sound information input through the sound input device.

An information processing method of an aspect of the present technology is an information processing method of an information processing device, including: a sound acquisition step of acquiring, by the information processing device, sound information of a first user that is input to a sound input device; and a display control step of controlling, by the information processing device, display of text information on a display device for a second user, the text information corresponding to the acquired sound information. In the display control step, control related to display amount of the text information is performed on the basis of at least one of the display amount of the text information on the display device or input amount of the sound information input through the sound input device.

An information processing system of an aspect of the present technology includes: a sound input device configured to acquire sound information of a first user; a display control device configured to control display of text information corresponding to the acquired sound information; and a display device configured to display the text information for a second user under the control of the display control device. The display control device performs control related to display amount of the text information on the basis of at least one of the display amount of the text information on the display device or input amount of the sound information input through the sound input device.

In an aspect of the present technology, sound information of a first user that is input is acquired, and display of text information on a display device for a second user is controlled, the text information corresponding to the acquired sound information. In the display control, control related to display amount of the text information is performed on the basis of at least one of the display amount of the text information on the display device or input amount of the sound information input through the sound input device.

Advantageous Effects of Invention

According to an aspect of the present technology, it is possible to have natural conversation using speech recognition.

BRIEF DESCRIPTION OF DRAWINGS

FIG. 12 is a diagram illustrating an example of determining whether a text has already been read.

FIG. 13 is a diagram illustrating a specific example of a text amount reduction process.

FIGS. 14A, 14B, and 14C are diagrams illustrating a specific example of a text amount reduction process.

MODE(S) FOR CARRYING OUT THE INVENTION

Next, best modes (hereinafter referred to as embodiments) for carrying out the present technology will be described in detail with reference to drawings.

<First Configuration Example of Conversation Assistance Device According to Embodiment of Present Technology>

Figure 1:
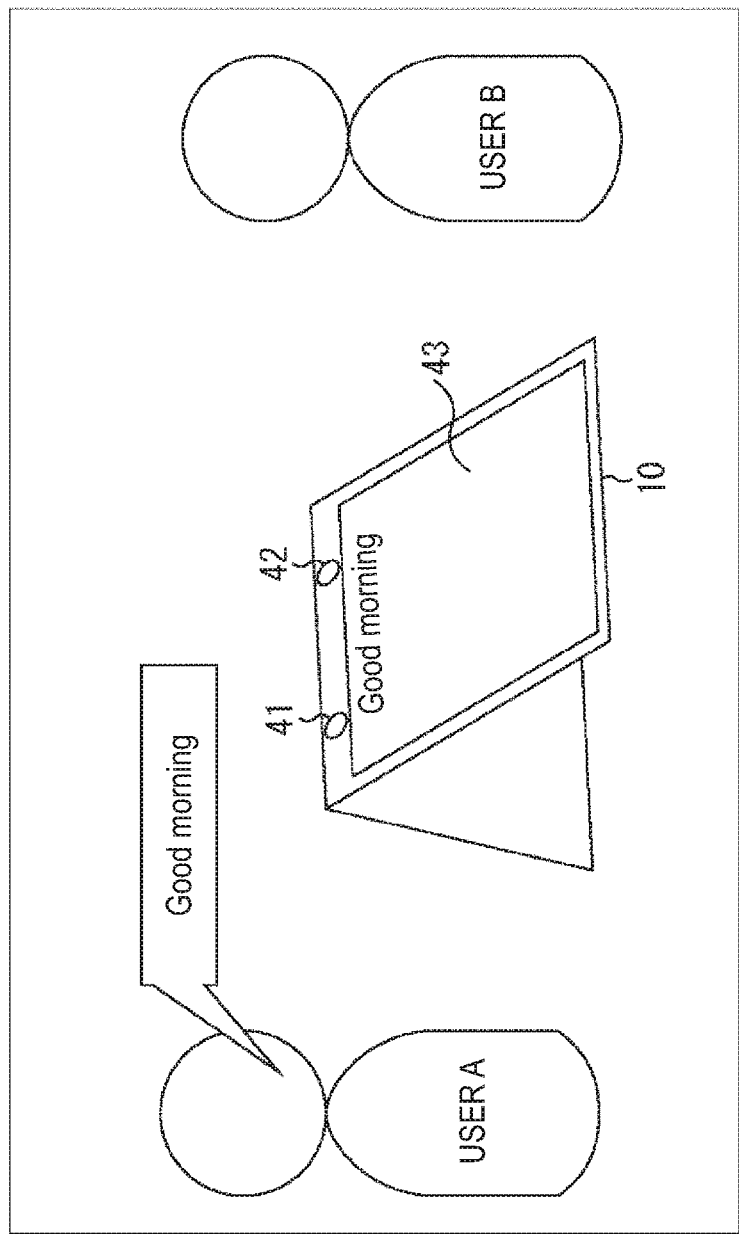
FIG. 1 is a diagram illustrating a first configuration example of a conversation assistance device according to the present technology.

FIG. 1 illustrates a first configuration example of a conversation assistance device according to an embodiment of the present technology. FIG. 1 illustrates a case where a conversation assistance device 10 is formed as a single housing.

The conversation assistance device 10 is a device for assisting conversation between a person (hereinafter, referred to as a user A) who does not have difficulty in hearing and a person (hereinafter, referred to as a user B) who has difficulty in hearing. Note that, it may be assumed that a first user according to an aspect of the present technology corresponds to the user A according to this configuration example, and it may be assumed that a second user according to an aspect of the present technology corresponds to the user 2 according to this configuration example. Note that, it is sufficient if the first user according to an aspect of the present technology is a user who inputs sound. In other words, the first user (user who inputs sound) is not limited to a single subject (user), and a plurality of subjects (users) may be the first user. In a similar way, it is sufficient if the second user according to an aspect of the present technology is a user who sees a displayed speech text. The second user is not limited to a single subject, and a plurality of subjects may be the second user.

Specifically, a speech of the user A is converted into a text (hereinafter, also referred to as a speech text) through a speech recognition process, and the speech text is displayed on a display unit 43 for the user B. By reading the display, it is possible for the user B to understand the speech text (character information) corresponding to the speech (sound information) of the user A.

The speech text displayed on the display unit 43 is being displayed until the user B finishes reading or until a predetermined period of time elapses.

For example, an image of the user B among images captured by an image capturing unit 41 or a speech of the user B collected by a sound collection unit 42 is used for determining whether or not the user B has finished reading the displayed speech text.

Note that, a display unit 22 (see FIG. 2) for the user A is installed on the back surface of the display unit 43 for the user B. The display unit 22 performs display in a way similar to the display unit 43. In other words, the display unit 22 displays the speech text corresponding to the speech of the user A. This enables the user A to check whether or not the speech of the user A is correctly recognized.

<Configuration Example of Conversation Assistance Device According to Embodiment of Present Technology>

Figure 2:
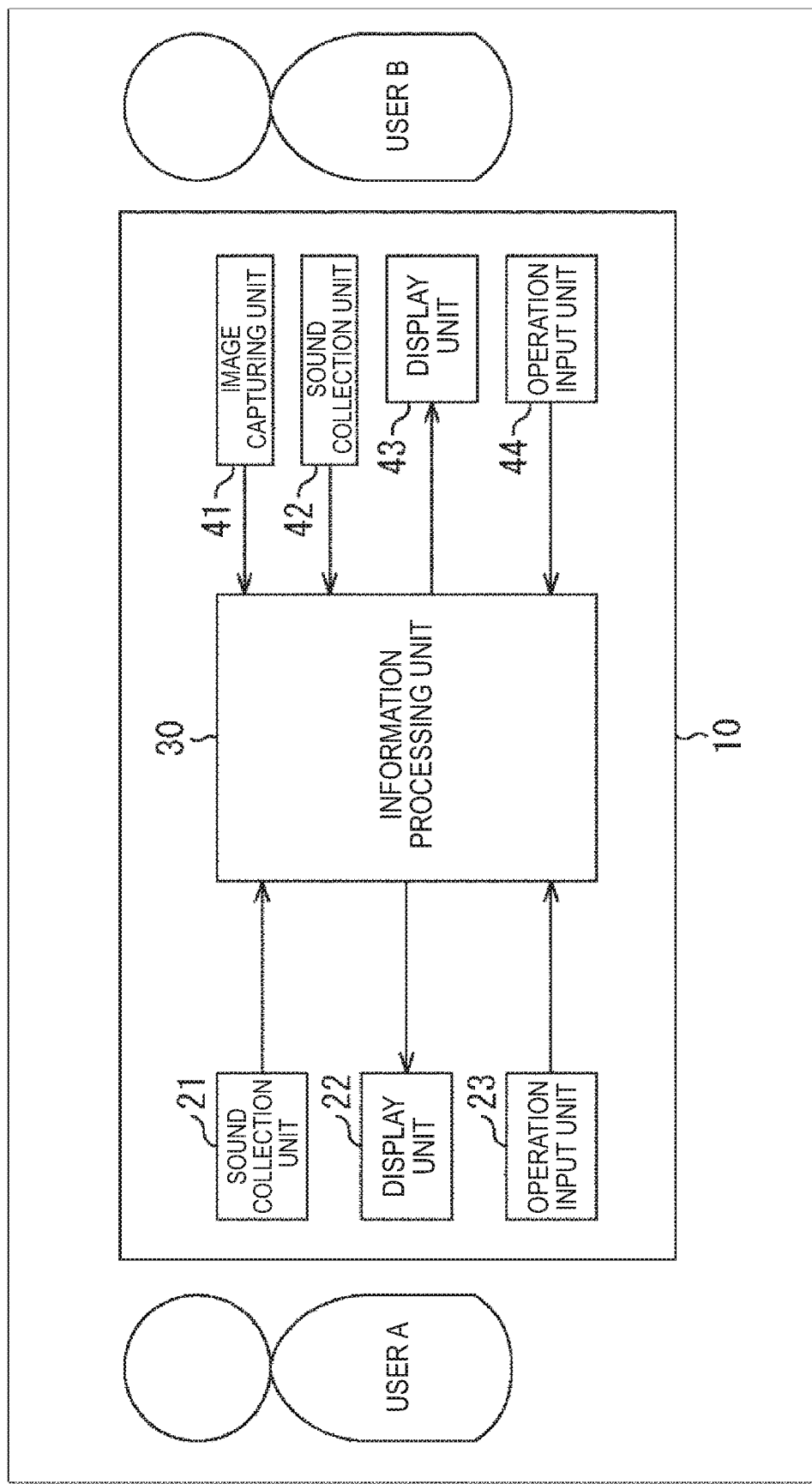
FIG. 2 is a block diagram illustrating an internal configuration example of the conversation assistance device according to the present technology.

FIG. 2 is a block diagram illustrating an internal configuration example of the conversation assistance device according to the embodiment of the present technology.

The conversation assistance device 10 includes a sound collection unit 21, the display unit 22, an operation input unit 23, an information processing unit 30, the image capturing unit 41, the sound collection unit 42, the display unit 43, and an operation input unit 44.

The sound collection unit 21, the display unit 22, and the operation input unit 23 are installed mainly for the user A.

The sound collection unit 21 collects voice (speech) of the user A, and provides the information processing unit 30 with a speech signal corresponding to the voice (speech) of the user A. The display unit 22 displays a screen corresponding to an image signal provided by the information processing unit 30 (for example, an image signal for displaying a speech text corresponding to the speech of the user A on the screen). The operation input unit 23 receives various kinds of operation from the user A, and notifies the information processing unit 30 of operation signals corresponding to the various kinds of operation.

The information processing unit 30 converts the speech signal provided by the sound collection unit 21 into a speech text through a speech recognition process. In addition, the information processing unit 30 provides the display unit 43 with an image signal for displaying the speech text on the screen. Note that, details of the information processing unit 30 will be described later.

The image capturing unit 41, the sound collection unit 42, the display unit 43, and the operation input unit 44 are installed mainly for the user B.

The image capturing unit 41 captures an image of the user B and the like, and provides the information processing unit 30 with a moving image signal obtained as a result of the image capturing. The sound collection unit 42 collects voice (speech) of the user B, and provides the information processing unit 30 with a speech signal corresponding to the voice (speech) of the user B. The display unit 43 displays a screen corresponding to the image signal provided by the information processing unit 30 for displaying the speech text corresponding to the speech of the user A on the screen. The operation input unit 44 receives various kinds of operation from the user B, and notifies the information processing unit 30 of operation signals corresponding to the various kinds of operation.

<Configuration Example of Functional Blocks Included in Information Processing Unit 30>

Figure 3:
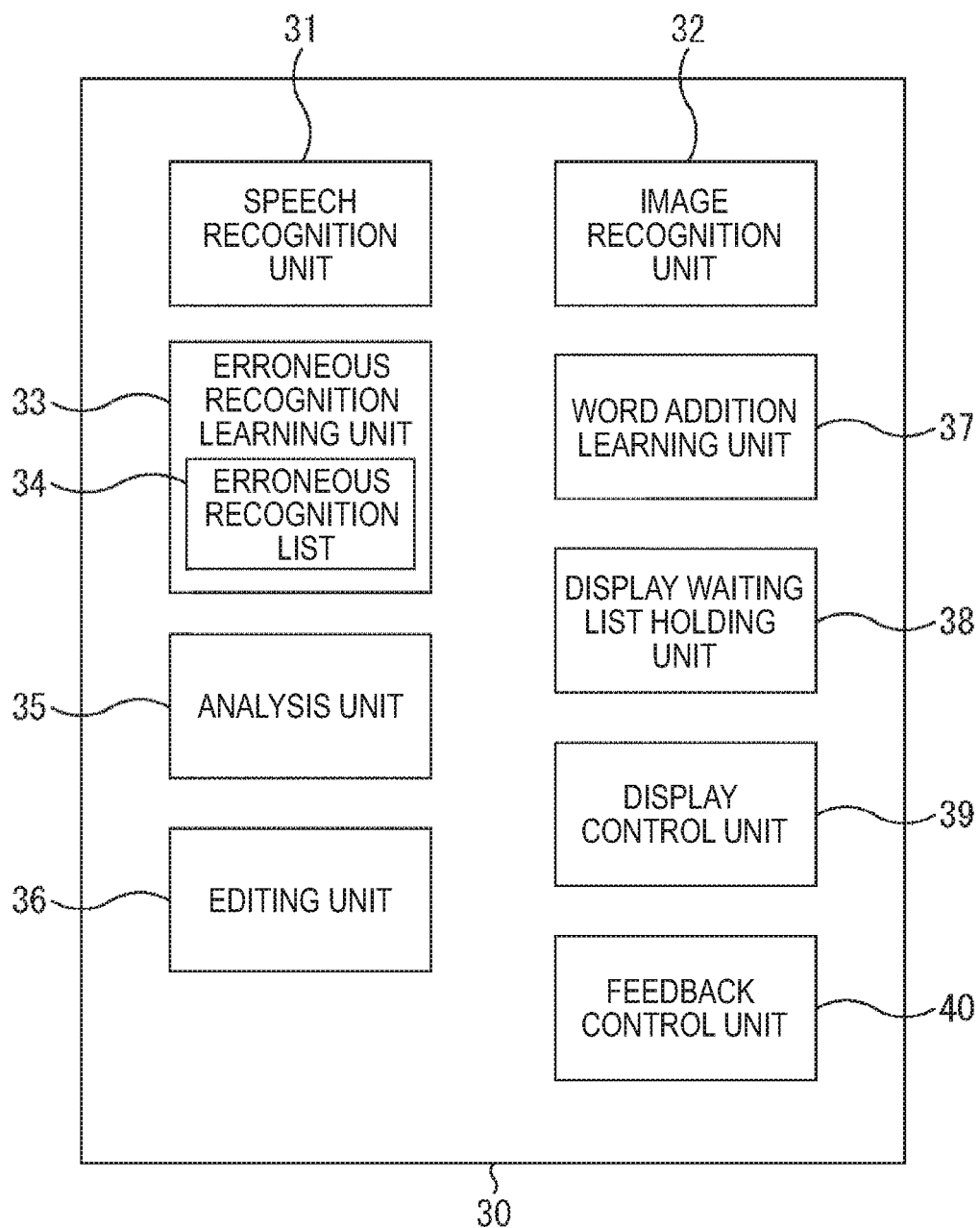
FIG. 3 is a functional block diagram of an information processing unit.

FIG. 3 illustrates a configuration example of functional blocks included in the information processing unit 30.

The information processing unit 30 includes a speech recognition unit 31, an image recognition unit 32, an erroneous recognition learning unit 33, an analysis unit 35, an editing unit 36, a word addition learning unit 37, a display waiting list holding unit 38, a display control unit 39, and a feedback unit 40.

The speech recognition unit 31 generates a speech text by converting the speech signal corresponding to the speech of the user A provided by the sound collection unit 21 into the speech text through the speech recognition process, and provides the speech text to the analysis unit 35.

In addition, the speech recognition unit 31 converts the speech signal corresponding to the speech of the user B provided by the sound collection unit 42 into a speech text through the speech recognition process, detects a specific keyword (such as "yes", "yeah", "ok", "understood", or "next" that are registered in advance) from the speech text, and then provides the detection result to the display control unit 39. The Specific keyword represents that the user B has already read the speech text of the user A.

The image recognition unit 32 detects a specific action (such as a nod, or movement of a gaze to the outside of the screen after gazing at the screen, for example) representing that the user B has already read the speech text on the basis of the moving image signal provided by the image capturing unit 41, and then provides the detection result to the display control unit 39. In addition, the image recognition unit 32 measures a distance between the user B and the display unit 43 on the basis of the moving image signal provided by the image capturing unit 41, and notifies the display control unit 39 of a measurement result. The distance between the user B and the display unit 43 is used for setting the character size of the speech text to be displayed on the display unit 43. For example, a larger character size is set as the distance between the user B and the display unit 43 gets longer.

Note that, in the case of using wearable equipment such as a head-mounted display (to be described later), a gaze direction may be determined on the basis of a direction of the wearable equipment, in other words, a direction of the head or a direction of the body of the user B. The direction of the wearable equipment may be determined on the basis of position information obtained by a camera, an acceleration sensor, a gyro sensor, or the like installed on the wearable equipment. In addition, it is also possible to determine Purkinje images on an eyeball and the center of a pupil of the user B by using an infrared camera and an infrared LED, and determine a gaze direction of the user B on the basis of them.

The erroneous recognition learning unit 33 handles editing operation (such as deletion instruction operation, speaking-again instruction operation, or banned word registration instruction operation) input by the user A or the user B with regard to the speech text corresponding to the speech of the user A obtained as a result of the speech recognition process, and then registers an erroneously recognized word included in the speech text, on an erroneous recognition list 34. In addition, in the case where a word registered on the erroneous recognition list 34 is included in the speech text corresponding to the speech of the user A obtained as a result of the speech recognition process, the erroneous recognition learning unit 33 requests a recognition result (second candidate or the like of recognition result) other than the erroneously recognized word (first candidate) from the speech recognition unit 31.

The analysis unit 35 makes an analysis such that the speech text corresponding to the speech of the user A generated by the speech recognition unit 31 is broken down into parts of speech, or such that a keyword is extracted, for example.

The editing unit 36 performs an editing process of appropriately adding a newline or a page break to the speech text on the basis of a result of the analysis made by the analysis unit 35, or performing a text amount reduction process of specifying a grammatical particle or the like that does not ruin the meaning of the speech text even if it is deleted. Subsequently, the editing unit 36 provides the edited speech text to the display waiting list holding unit 38. Note that, in the editing process, it may be deemed to perform at least one of the newline addition, page-break addition, or text amount reduction process, and it is also possible to omit at least one of the newline addition, page-break addition, or text amount reduction process.

In addition, the editing unit 35 is also capable of combining a plurality of speech texts that is associated with each other into a thread, and providing the thread to the display waiting list holding unit 38. In this case, it is also possible to display an icon corresponding to a thread that is waiting to be displayed, while displaying a current thread. A display object representing the thread that is waiting to be displayed is not limited to the icon. Appropriate settings may be configured. According to such configurations, it is possible to easily recognize how far the user B has read a speech text of a conversation partner. In addition, according to such configurations, it is also possible for the user B to encourage input amount from the user A to be reduced on the basis of the progress of the speech text.

In addition, the editing unit 36 controls a process of deleting a sentence in a speech text, a process of inserting a speech text corresponding to words that are said again, or a process of registering a banned word, on the basis of editing operation input by the user A through the operation input unit 23 with regard to a speech text displayed on the display unit 22, the speech text corresponding to a speech of the user A. In addition, the editing unit 36 controls a process of adding a sign such as "? (question mark)" to the speech text that is displayed on the display unit 22 and that corresponds to the speech of the user A, on the basis of word addition operation input by the user A through the operation input unit 23 with regard to the speech text (specifically, operation of adding the sign such as "?"). Note that, it may also possible to add emoji, an emoticon, a sign other than "?", or the like.

Note that, the editing unit 36 may perform the editing process on the speech text that is displayed on the display unit 43 and that corresponds to the speech of the user A, also on the basis of editing operation or word addition operation input by the user B through the operation input unit 44. In other words, both the user A and the user B are capable of performing editing operation and word addition operation on a displayed speech text corresponding to a speech of the user A.

The word addition learning unit 37 learns the word addition operation input by the user A or the user B, and controls the editing unit 36 such that the editing unit 36 adds a similar sign or the like to a similar speech text on the basis of the learning result, without word addition operation performed by the user A or the user B.

For example, in the case where word addition operation instructing to add the sign "?" to a speech text "did you take medicine" corresponding to a speech of the user A is learned, the editing unit 36 is controlled such that the sign "?" is added to the speech text "did you take medicine" to obtain an edited speech text "did you take medicine?" without word addition operation performed by the user A or the user B.

The display waiting list holding unit 38 registers speech texts subjected to the editing process on a display waiting list in chronological order, in other words, in the order they are said by the user A. The editing process includes at least one of the newline addition, page-break addition, or text amount reduction process (sometimes the text amount reduction process is not performed depending on the number of characters). A speech text registered on the display waiting list is deleted from the display waiting list in the case where the speech text is read out by the display control unit 39.

The display control unit 39 reads out speech texts from the display waiting list in chronological order, generates an image signal for displaying the read speech texts on the screens, and provides the image signal to the display unit 22 and the display unit 43. In addition, the display control unit 39 controls display amount of the display texts on the display unit 22 and the display unit 43 on the basis of display amount of currently displayed speech texts on the display unit 22 and the display unit 43, a detection result of a specific keyword representing that the user B has already read the speech texts, a detection result of a specific action representing that the user B has already read the speech texts, or the like. The detection result of the specific keyword is provided by the speech recognition unit 31, and the detection result of the specific action is provided by the image recognition unit 32. In addition, the display control unit 39 sets a character size for displaying the speech texts in accordance with a distance between the user B and the display unit 43.

By displaying characters or outputting sound, the feedback control unit 40 controls feedback for instructing the user A to speed up (or slow down) speech speed, instructing the user A to punctuate a speech, or prompting the user A to continue speaking, in accordance with speech speed of the user A, speech length of the user A, speech recognition character amount per unit time, amount of speech texts displayed on the display unit 43, amount of speech texts registered on the display waiting list, information indicating whether or not the user B has already read the speech texts, reading speed of the user B, or the like. Here, the user A is a speaking person. In addition, the feedback control unit 40 controls feedback for prompting the user B to read a speech text by displaying characters or the like in accordance with amount of speech texts displayed on the display unit 43, amount of speech texts registered on the display waiting list, information indicating whether or not the user B has already read the speech texts, reading speed of the user B, or the like.

Note that, it is not necessary to put the above-described functional blocks of the information processing unit 30 in a single housing. The above-described functional blocks may be distributed to a plurality of housings. In addition, a part or all of the functional blocks may be installed in the server on the Internet, in other words, on a cloud network.

<Second Configuration Example of Conversation Assistance Device According to Embodiment of Present Technology>

Figure 4:
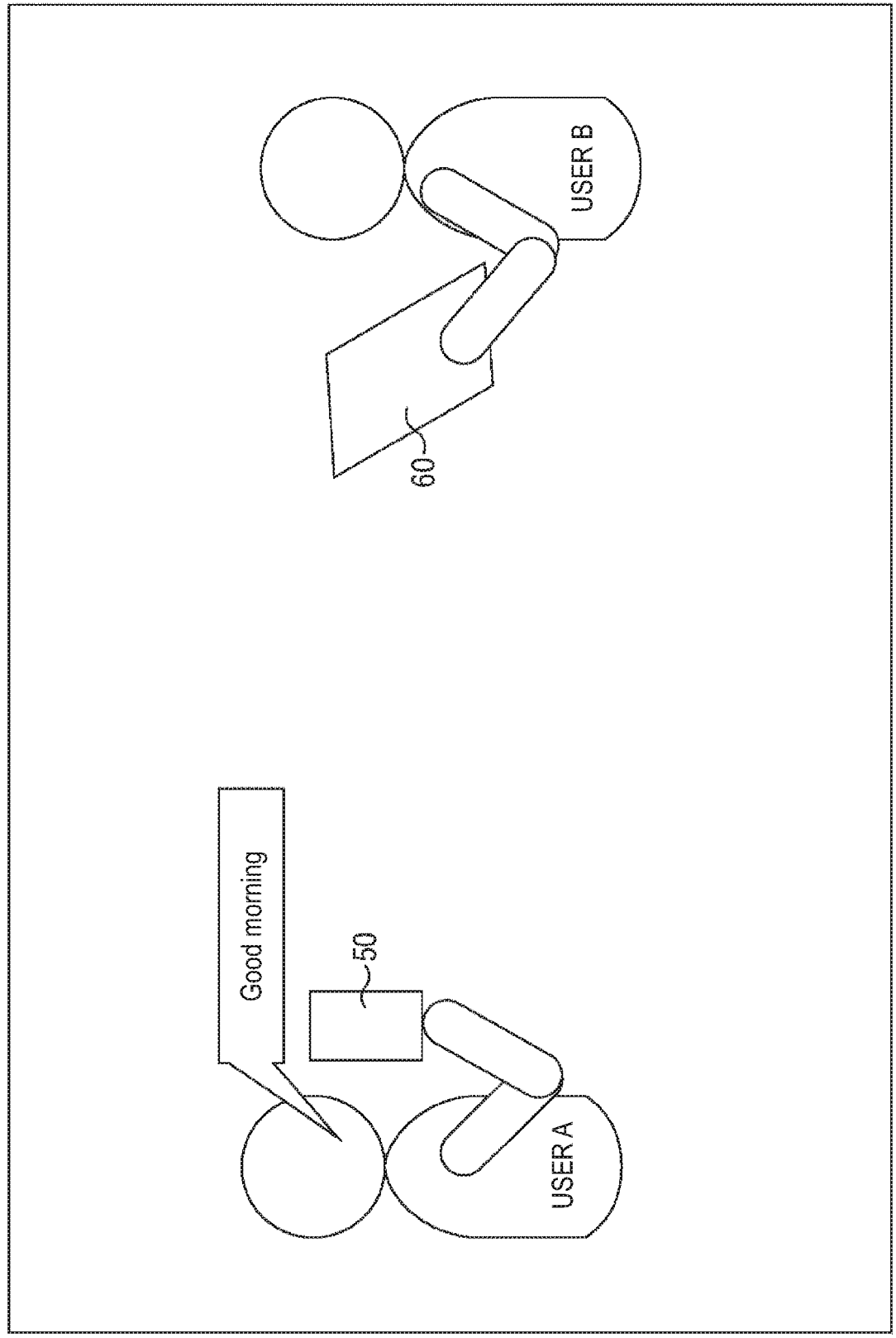
FIG. 4 is a diagram illustrating a second configuration example of a conversation assistance device according to the present disclosure.

FIG. 4 is a second configuration example of the conversation assistance device according to the embodiment of the present technology. According to the second configuration example, the conversation assistance device 10 is configured as a system including a plurality of different electronic devices. In this case, the plurality of electronic devices included in the conversation assistance device 10 may be connected in a wired manner or may be connected through predetermined wireless communication (such as Bluetooth (registered trademark), Wi-Fi (registered trademark), for example).

In the second configuration example, the conversation assistance device 10 includes a smartphone 50 that the user A uses, and a tablet PC (hereinafter, referred to as a tablet) 60 that the user B uses.

Figure 5:
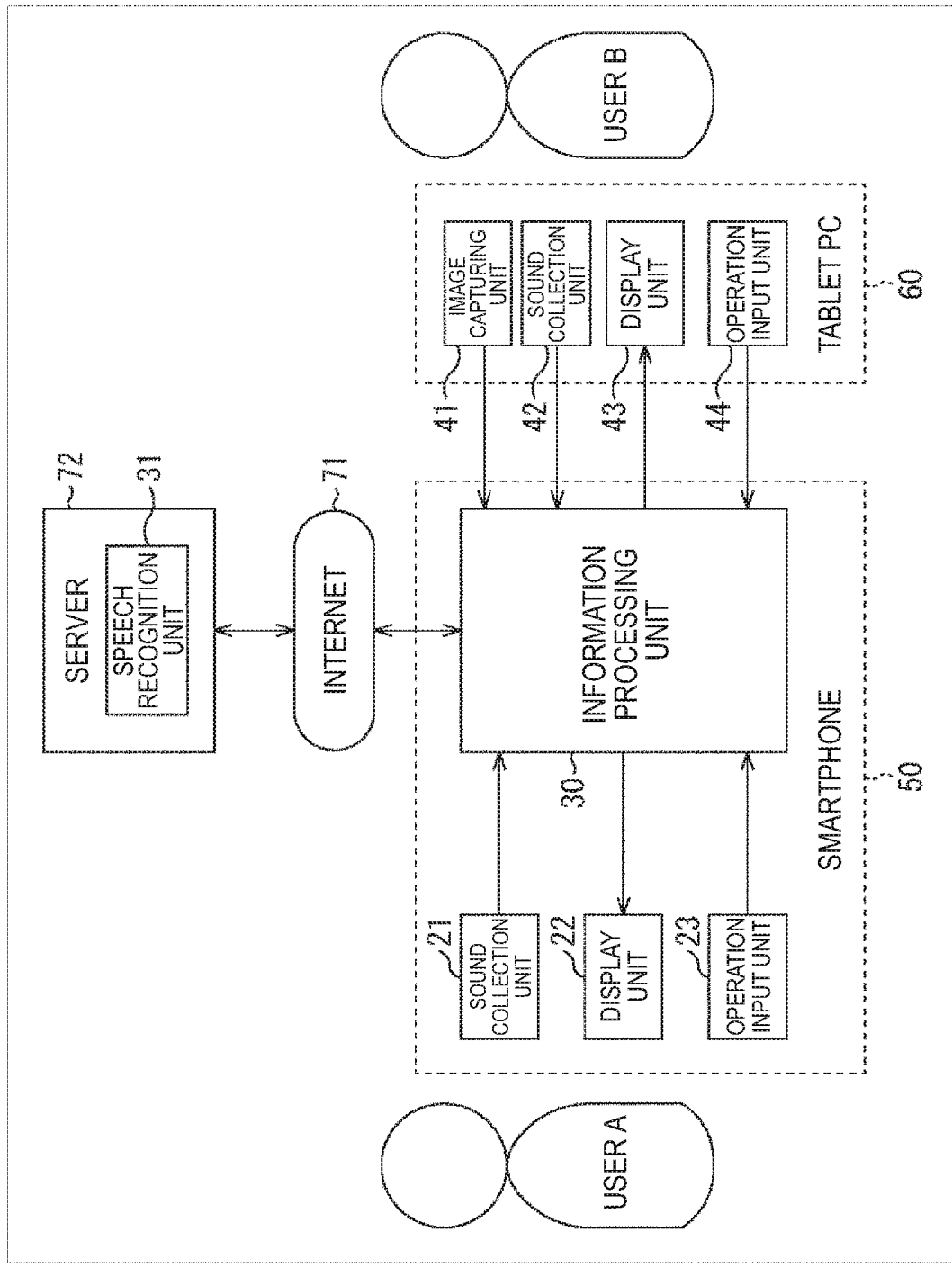
FIG. 5 is a block diagram in which structural elements of the conversation assistance device are distributed in accordance with the second configuration example.

FIG. 5 illustrates a state where the structural elements of the conversation assistance device 10 illustrated in FIG. 2 are distributed to the smartphone 50 and the tablet PC 60.

In other words, among the structural elements of the conversation assistance device 10, the sound collection unit 21, the display unit 22, the operation input unit 23, and the information processing unit 30 are implemented by the smartphone 50. In this case, a microphone, a display, and a touchscreen or the like included in the smartphone 50 respectively correspond to the sound collection unit 21, and the operation input unit 23. In addition, an application program executed by the smartphone 50 corresponds to the information processing unit 30.

In addition, among the structural elements of the conversation assistance device 10, the image capturing unit 41, the sound collection unit 42, the display unit 43, and the operation input unit 44 are implemented by the tablet 60. In this case, a camera, a microphone, a display, and a touchscreen or the like included in the tablet 60 respectively correspond to the image capturing unit 41, the sound collection unit 42, the display unit 43, and the operation input unit 44.

Note that, in the case of FIG. 5, the speech recognition unit 31 is installed in a server 72 that is capable of connecting via the Internet 71, among the functional blocks of the information processing unit 30.

<Third Configuration Example of Conversation Assistance Device According to Embodiment of Present Technology>

Figure 6:
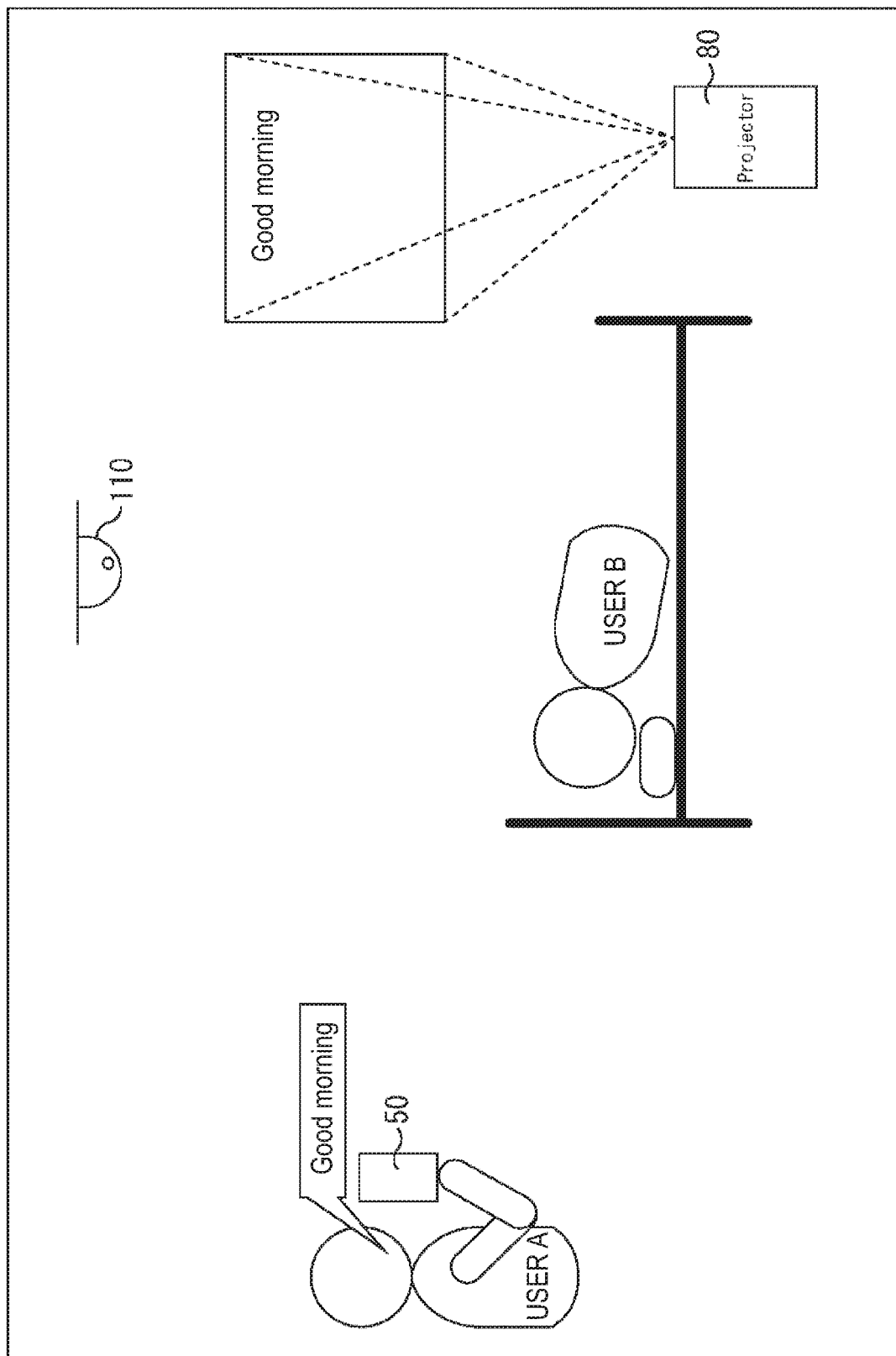
FIG. 6 is a diagram illustrating a third configuration example of a conversation assistance device according to the present technology.

FIG. 6 is a third configuration example of the conversation assistance device according to the embodiment of the present technology. According to the third configuration example, the conversation assistance device 10 is configured as a system including a plurality of different electronic devices.

In other words, the third configuration example includes the smartphone 50, a projector 80, and a camera 110. The smartphone 50 is used by the user A. The projector 80 projects a video for displaying speech texts on a position seen by the user B when the user B is lying on a bed, such as a wall or a ceiling of a room. The camera 110 is installed on the ceiling or the like.

Figure 7:
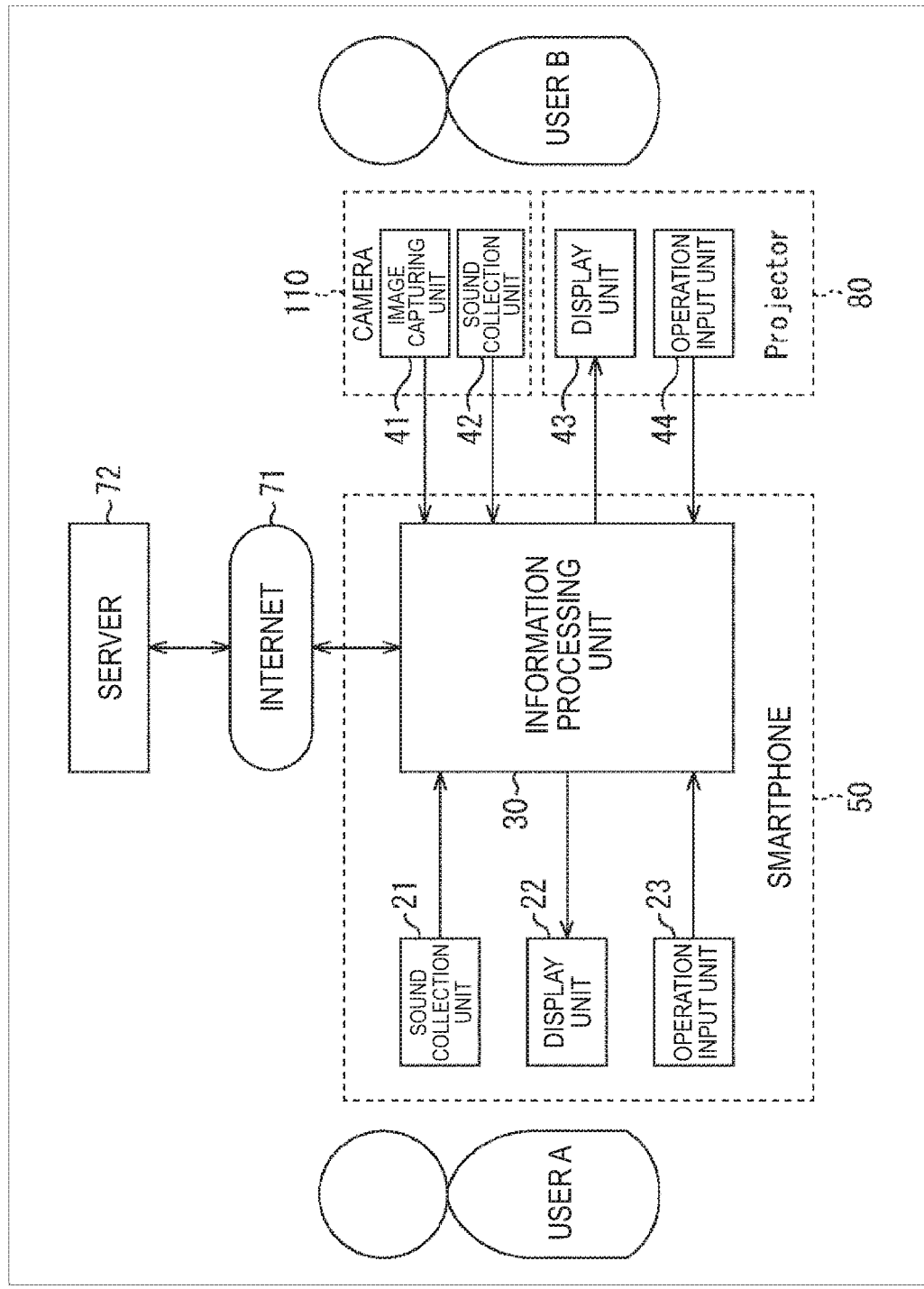
FIG. 7 is a diagram in which structural elements of the conversation assistance device are distributed in accordance with the third configuration example.

FIG. 7 illustrates a state where the structural elements of the conversation assistance device 10 illustrated in FIG. 2 are distributed to the smartphone 50, the projector 80, and the camera 110.

In other words, among the structural elements of the conversation assistance device 10, the sound collection unit 21, the display unit 22, the operation input unit 23, and the information processing unit 30 are implemented by the smartphone 50.

In addition, among the structural elements of the conversation assistance device 10, the image capturing unit 41 and the sound collection unit 42 are implemented by the camera 110. In this case, an image sensor and a microphone of the camera 110 respectively correspond to the image capturing unit 41 and the sound collection unit 42.

Among the structural elements of the conversation assistance device 10, the display unit 43 and the operation input unit 44 are implemented by the projector 80. In this case, a projector unit and a remote control of the projector 80 respectively correspond to the display unit 43 and the operation input unit 44.

In the case of FIG. 7, the speech recognition unit 31 is also installed in the server 72 that is capable of connecting via the Internet 71, among the functional blocks of the information processing unit 30.

<Fourth Configuration Example of Conversation Assistance Device According to Embodiment of Present Technology>

Figure 8:
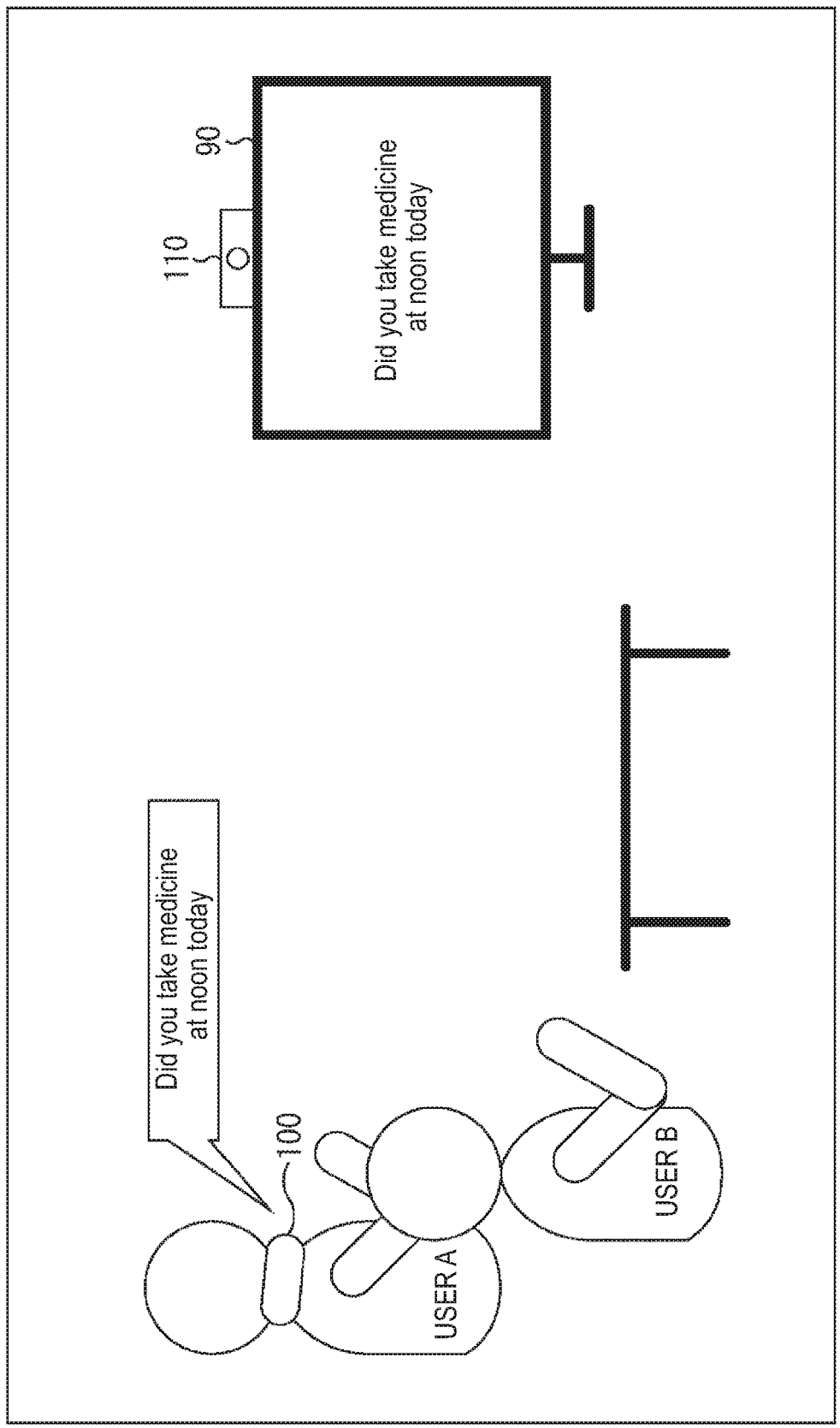
FIG. 8 is a diagram illustrating a fourth configuration example of a conversation assistance device according to the present disclosure.

FIG. 8 is a fourth configuration example of the conversation assistance device according to the embodiment of the present technology. According to the fourth configuration example, the conversation assistance device 10 is configured as a system including a plurality of different electronic devices.

In other words, the fourth configuration example includes a neckband microphone 100, a television receiver (hereinafter, referred to as TV) 90, and a camera 110. The neckband microphone 100 is used by the user A. The TV 90 is placed at a position seen by the user A and the user B. The camera 110 is placed on the TV 90.

Figure 9:
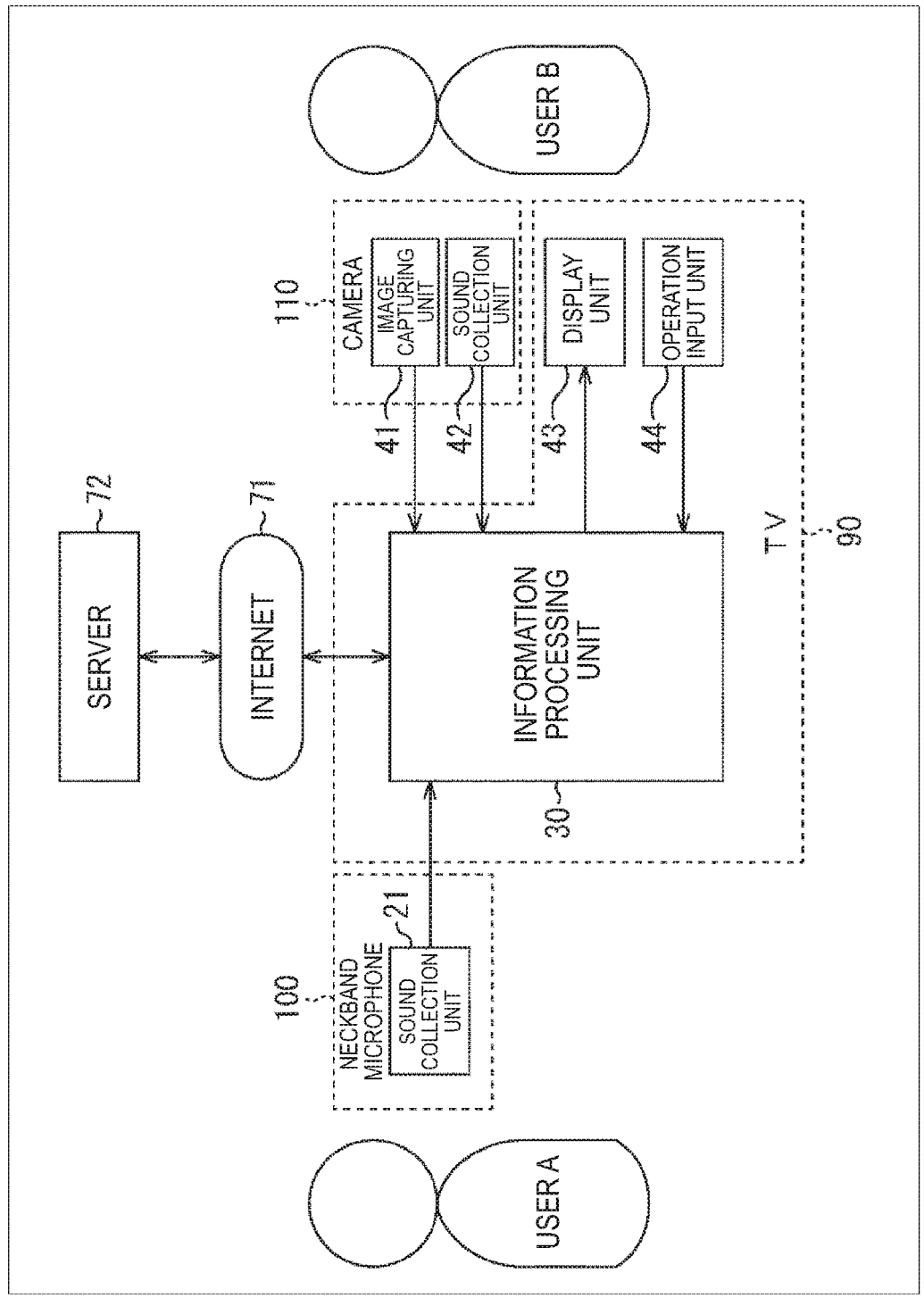
FIG. 9 is a block diagram in which structural elements of the conversation assistance device are distributed in accordance with the fourth configuration example.

FIG. 9 illustrates a state where the structural elements of the conversation assistance device 10 illustrated in FIG. 2 are distributed to the neckband microphone 100, the TV 90, and the camera 110.

In other words, among the structural elements of the conversation assistance device 10, the sound collection unit 21 is implemented by the neckband microphone 100. Note that, the neckband microphone 100 may include a speaker that outputs sound in addition to the sound collection unit 21.

Among the structural elements of the conversation assistance device 10, the image capturing unit 41 and the sound collection unit 42 are implemented by the camera 110.

Among the structural elements of the conversation assistance device 10, the display unit 43 and the operation input unit 44 are implemented by the TV 90. In this case, a display and a remote control of the TV 90 respectively correspond to the display unit 43 and the operation input unit 44. Note that, the display and the remote control of the TV 90 also serve as the display unit 22 and the operation input unit 23 for the user A.

In the case of FIG. 9, the speech recognition unit 31 is also installed in the server 72 that is capable of connecting via the Internet 71, among the functional blocks of the information processing unit 30.

As described in the first to fourth configuration examples, the conversation assistance device 10 may be implemented by a single electronic device, or may be implemented by a system in which a plurality of electronic devices is combined. Note that, it is possible to appropriately combine the above-described first to fourth configuration examples.

In addition, as the electronic device constituting the conversation assistance device 10 as a system, it is also possible to adopt wearable equipment such as a wristwatch-type terminal or a head-mounted display, a monitor for a personal computer (PC), or the like in addition to the above-described examples.

<Operation of Conversation Assistance Device 10>

Next, operation of the conversation assistance device 10 will be described.

Figure 10:
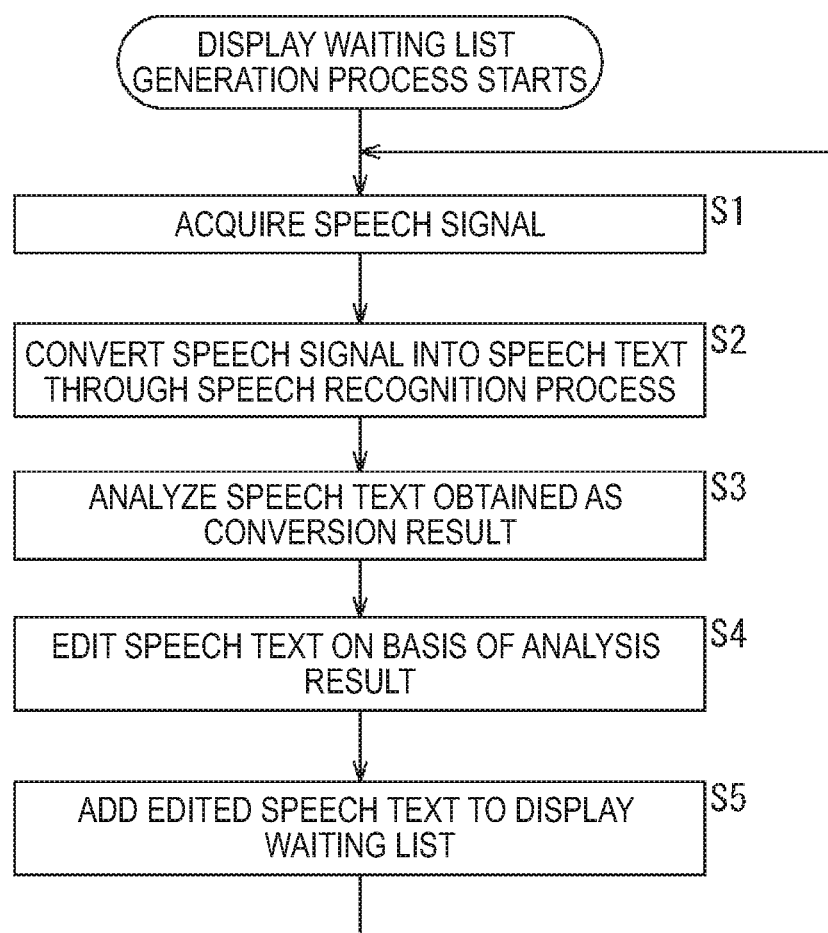
FIG. 10 is a flowchart illustrating a display waiting list generation process.

FIG. 10 is a flowchart illustrating a display waiting list generation process performed by the conversation assistance device 10. The display waiting list generation process is repeatedly executed after the conversation assistance device 10 is activated until the power is turned off.

In Step S1, the sound collection unit 21 acquires voice of the user A when the user A speaks. The sound collection unit 21 converts the voice of the user A into a speech signal, and provides the speech signal to the information processing unit 30. In Step S2, the speech recognition unit 31 performs a speech recognition process and the information processing unit 30 converts the speech signal corresponding to the speech of the user A into a speech text.

In Step S3, the analysis unit 35 analyzes the speech text corresponding to the speech of the user A generated by the speech recognition unit 31. In Step S4, the editing unit 36 performs an editing process including at least one of the newline addition, page break addition, or text amount reduction process on the speech text corresponding to the speech of the user A on the basis of the analysis result, and provides the display waiting list holding unit 38 with the speech text subjected to the editing process.

In Step S5, the display waiting list holding unit 38 holds speech texts that have been provided by the editing unit 36 and that have been subjected to the editing process, in chronological order. Next, the process returns to Step S1 and repeats the subsequent steps.

Figure 11:
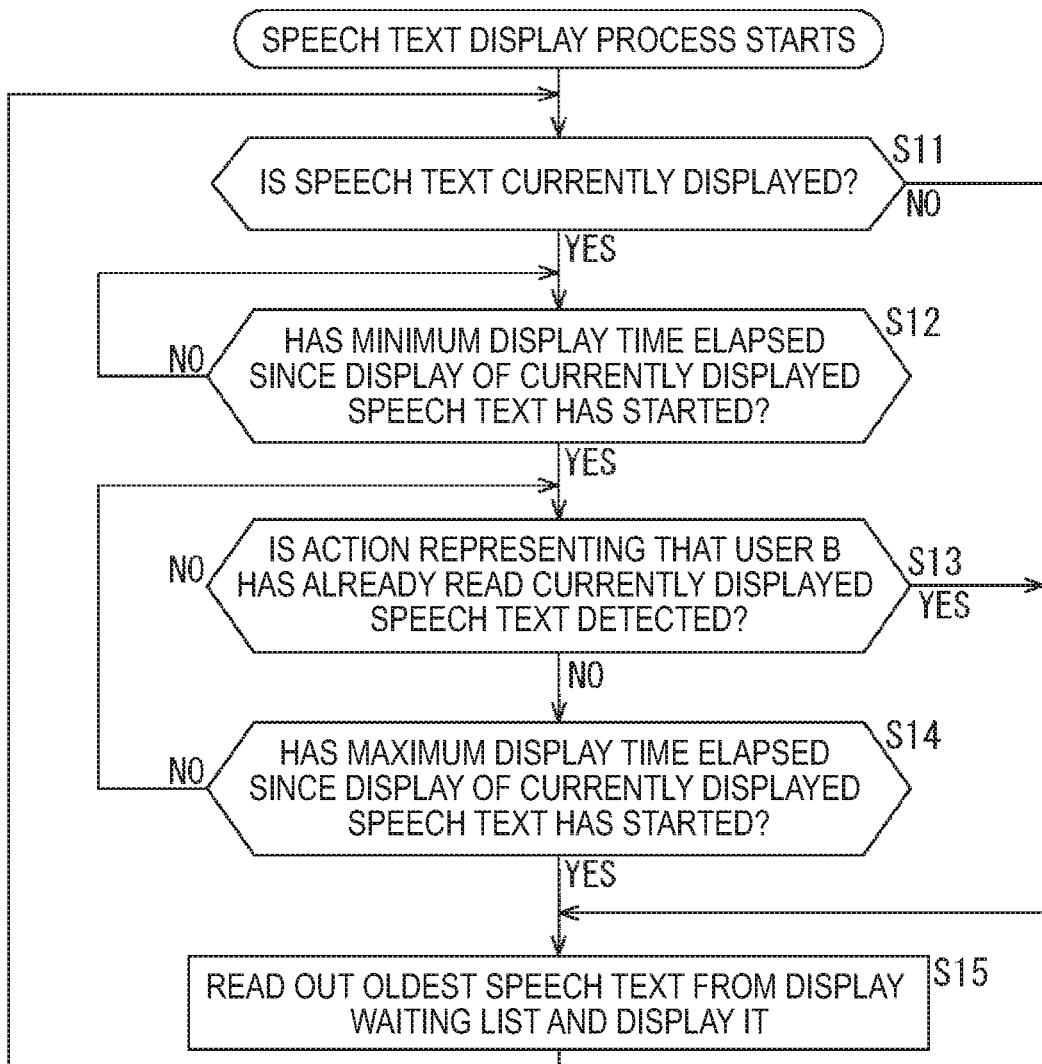
FIG. 11 is a flowchart illustrating a speech text display process.

FIG. 11 is a flowchart illustrating a speech text display process performed by the conversation assistance device 10. The speech text display process is repeatedly executed in parallel with the above-described display waiting list generation process, after the conversation assistance device 10 is activated until the power is turned off.

In Step S11, the display control unit 39 determines whether or not a speech text is currently displayed on the screens of the display units 22 and 43. The process proceeds to Step S12 in the case where it is determined that the speech text is displayed. In Step S12, the display control unit 39 determines whether or not a preset minimum display time has elapsed since display of the currently displayed speech text has started, and waits until the minimum display time elapses. The process proceeds to Step S13 in the case where the minimum display time has elapsed.

In Step S13, the display control unit 39 determines whether or not it is detected that the user B has already read the displayed speech text, on the basis of a detection result of the specific keyword representing that the user B has already read the speech text, and a detection result of the specific action representing that the user B has already read the speech text. The detection result of the specific keyword is provided by the speech recognition unit 31, and the detection result of the specific action is provided by the image recognition unit 32.

FIG. 12 illustrates an example of determining whether the user B has already read the displayed speech text in Step S13.

For example, in the case where a specific keyword such as "yes" is detected from a speech recognition result of a speech of the user B, it is estimated that the user B has understood the displayed speech text when the specific keyword has been detected, and it is determined that it is detected that the user B has already read the displayed speech text. The specific keyword represents that the user B has already read the displayed speech text.

Alternatively, for example, in the case where a specific action such as a nod is detected from an image recognition result of a moving image that captures the user B, it is estimated that the user B has understood the displayed speech text when the specific action has been detected a predetermined number of times (such as twice), and it is determined that it is detected that the user B has already read the displayed speech text. The specific action represents that the user B has already read the displayed speech text.

Alternatively, for example, in the case where a state in which the user B is gazing at a screen (the display unit 43) and then switches his/her gaze to a direction out of the screen, is detected from an image recognition result of a moving image that captures the user B, it is estimated that the user B has understood the displayed speech text when the state continues a predetermined period of time, and it is determined that it is detected that the user has already read the displayed speech text.

Alternatively, for example, in the case where it is detected that the user A makes a new speech from a speech recognition result of a speech of the user A, it is estimated that conversation progresses between the user A and the user B when the new speech is detected, it is also estimated that the user B has understood the speech, and it is determined that it is detected that the user B has already read the text.

Note that, the methods of detecting whether the user B has already read the text are not limited to the above-described examples. For example, it is also possible for the users to arbitrarily add a specific keyword or action representing that a user has already read a text.

Returning to FIG. 12, the process proceeds to Step S14 in the case where it is not detected that the user B has already read the text in Step S13. In Step S14, the display control unit 39 determines whether or not a preset maximum display time has elapsed since display of the currently displayed speech text has started, and the process returns to Step S13 until the maximum display time elapses. Subsequently, Step S13 and Step S14 are repeated. Next, the process proceeds to Step S15 in the case where it is detected that the user B has already read the text, or in the case where the maximum display time elapses.

In Step S15, the display control unit 39 reads out speech texts from the display waiting list in chronological order, generates an image signal for displaying the read speech texts on the screens, and provides the image signal to the display unit 22 and the display unit 43. At this time, in the case where the screens of the display unit 22 and the display unit 43 have already been full of speech texts, the screens are scrolled, a speech text that is displayed on the top of the screens disappears from the screens, and then a speech text that is newly read out from the display waiting list is displayed on the screens.

Note that, in the case where it is determined that a speech text is not currently displayed on the screens of the display units 22 and 43 in Step S11, the Step S12 and Step S14 are skipped and the process proceeds to Step S15.

Next, the process returns to Step S11 and the subsequent steps are repeated.

As described above, the display waiting list generation process and the speech text display process are executed in parallel with each other. Accordingly, a speech of the user A is provided to the user B as a speech text, and speech texts are sequentially displayed as the user B reads the speech texts.

<Specific Example of Editing Process Including at Least One of Newline Addition, Page-break Addition, or Text Amount Reduction Process>

Next, a specific example of an editing process including at least one of newline addition, page-break addition, or a text amount reduction process performed by the editing unit 36 will be described.

For example, FIG. 13 illustrates a case where the user A and the user B make conversation by using the conversation assistance device 10. The user A is an elementary school child, and the user B is a mother of the user A. In FIG. 13, it is assumed that the user A says, "When I went to school yesterday I was asked to bring 10000 yen for school trip" in one breath without punctuation.

FIGS. 14A, 14B, and 14C illustrate a display example of the display unit 43 under the situation illustrated in FIG. 13. Note that, FIG. 14A illustrates a state where the editing process is not performed, FIG. 14B illustrates a state where a newline and a page break are added among the editing processes, and FIG. 14C illustrates a state where all the newline addition, page-break addition, and text amount reduction process are performed.

In the case where the user A speaks in one breath without punctuating his/her speech as illustrated in FIG. 13, the display unit 43 initially displays a speech text that is not subjected to the editing process as illustrated in FIG. 14A. In this state, newlines and a page break are inserted regardless of meanings or context of the speech text. Therefore, it is difficult to read the speech text. In addition, the numerical value (10000 yen in the case of FIG. 13) is separated, and there is a possibility that the numerical value is erroneously understood.

When the user B performs first operation (for example, operation of tapping the screen) on the display of FIG. 14A, the newlines and the page break among the editing processes are inserted. Therefore, as illustrated in FIG. 14B, the newlines and the page break are inserted in accordance with the meaning and context of the speech text. Accordingly, it becomes easier to read the speech text, and an effect of inhibiting misunderstanding of the numerical value or the like is expected.

When the user B performs second operation (such as operation of tapping the screen twice) on the display of FIG. 14B, the text amount reduction process is additionally performed. Therefore, as illustrated in FIG. 14C, it is possible to reduce the text amount of the speech text without ruining the meaning or context of the speech text. Accordingly, in addition to the above-described effects, an effect of shortening time it takes the user B to read the speech text is expected.

Note that, when the user B performs third operation (such as operation of swiping the screen) on the display of FIG. 14C, a speech text that is displayed on the screen may disappear from the screen.

Alternatively, in the case where the user B performs the first operation on the display of FIG. 14B, the screen may return to the display of FIG. 14A. In a similar way, in the case where the user B performs the second operation on the display of FIG. 14C, the screen may return to the display of FIG. 14B.

Alternatively, FIG. 14B may be displayed when the user B performs the first operation on the display of FIG. 14A, FIG. 14C may be displayed when the user B subsequently performs the first operation, and the displayed speech text may disappear from the screen when the user B subsequently performs the first operation. Next, FIG. 14C, FIG.

14B, and FIG. 14A are alternately displayed each time the user B performs the first operation again.

Note that, in the above description, the editing process is performed on the displayed speech text in accordance with operation performed by the user B. However, it is also possible to perform the editing process on the displayed speech text in accordance with operation performed by the user A. In addition, at least one of the first operation, the second operation, or the third operation may be considered as the predetermined operation according to the aspect of the present technology.

<Another Specific Example of Editing Process Including Text Amount Reduction Process>

Next, another specific example of the editing process including the text amount reduction process will be described.

Figure 15:
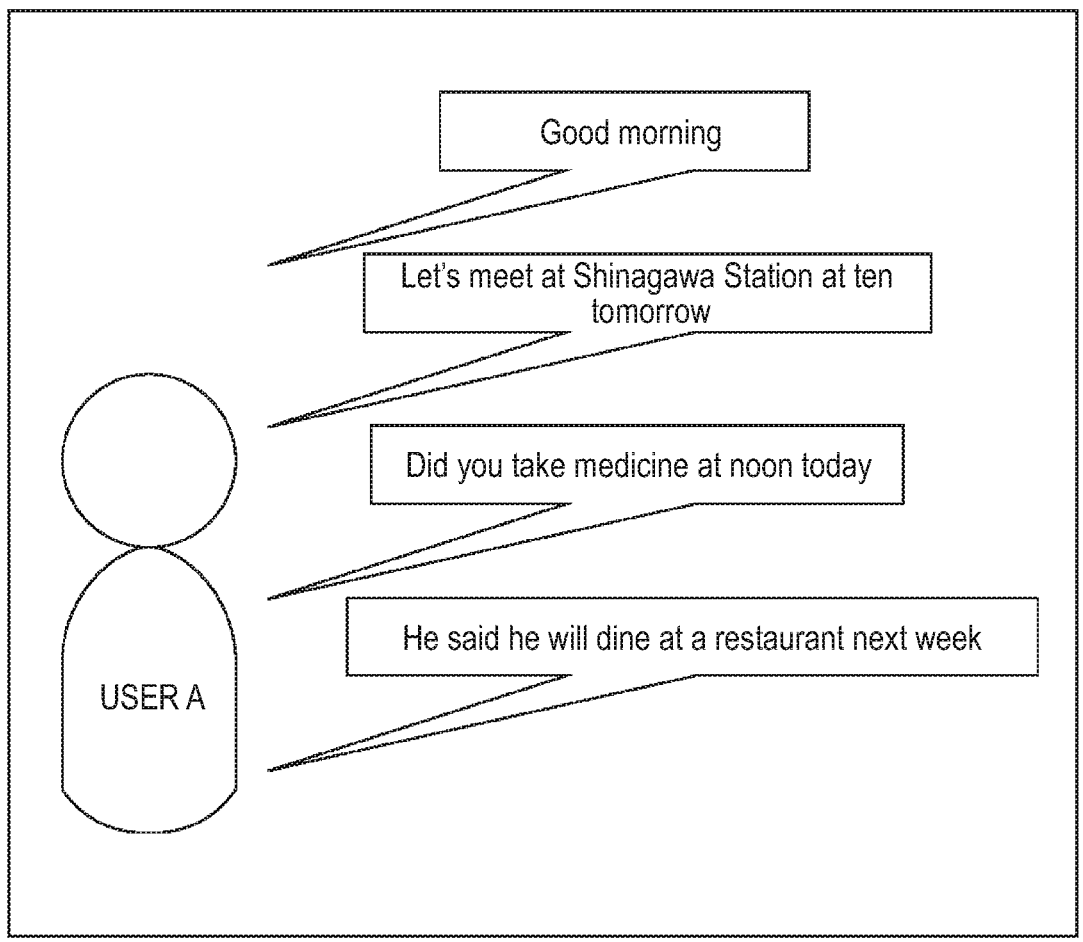
FIG. 15 is a diagram illustrating a specific example of a text amount reduction process.

FIG. 15 illustrates a case where the user A and the user B make conversation by using the conversation assistance device 10. However, the user B is not illustrated. In FIG. 15, the user A says relatively short sentences with punctuation such as "Good morning" and "Let's meet at Shinagawa Station at ten tomorrow".

Figure 16:
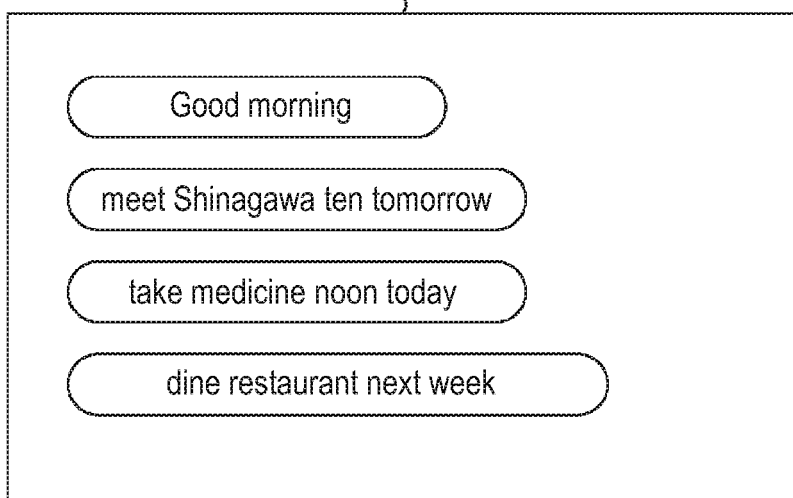
FIG. 16 is a diagram illustrating a specific example of a text amount reduction process.

FIG. 16 illustrates a display example of speech texts on the display unit 43. The speech texts correspond to speeches of the user A illustrated in FIG. 15. In the case where the user A says relatively short sentences with punctuation, the speech texts corresponding to the short sentences are displayed such that the speech texts are punctuated for each short minute as illustrated in FIG. 16. Note that, in FIG. 16, the speech texts are displayed such that the speech texts other than "Good morning" are subjected to the text amount reduction process that eliminates grammatical particles and the like while leaving nouns and verbs. In other words, in the text amount reduction process according to the specific example, parts of speech that are not important for understanding the meaning or context of the speech texts are appropriately omitted. Note that, words to be omitted are not limited to the parts of speech. It is possible for the user to appropriately set what is to be omitted.

Note that, instead of eliminating grammatical particles and the like that do not ruin the meaning or context of the speech texts even if they are eliminated, it is also possible to display the grammatical particles and the like such that they are less obvious than the nouns, verbs, and the like that relate to the meaning or context of the speech texts. In other words, it is possible to display the speech texts such that the nouns, verbs, and the like are more prominent than the grammatical particles and the like.

Figure 17:
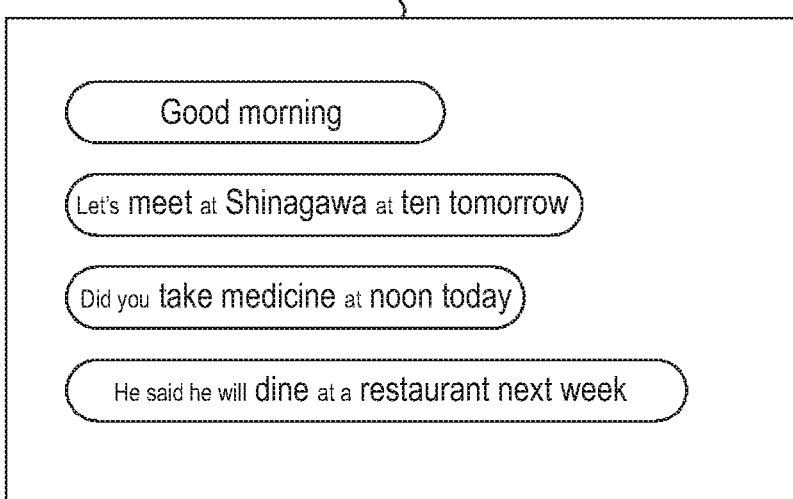
FIG. 17 is a diagram illustrating a specific example of a text amount reduction process.

FIG. 17 illustrates a display example in which character sizes of grammatical particles and the like are smaller than nouns, verbs, and the like that relate to the meaning or context of the speech texts, such that the nouns, verbs, and the like becomes prominent.

In addition, although not illustrated in the drawings, it is also possible to display speech texts such that characters of grammatical particles and the like are displayed in light colors and characters of nouns, verbs, and the like are displayed in dark colors. Alternatively, it is also possible to display speech texts such that brightness of characters of grammatical particles and the like becomes lower and brightness of characters of nouns, verbs, and the like becomes higher. Alternatively, it is also possible to display speech texts such that line thickness of characters of grammatical particles and the like becomes thin and line thickness of characters of nouns, verbs, and the like becomes thick.

As described above, the user B does not read the obscure grammatical particles and the like but reads the prominent nouns, verbs, and the like, in the case where speech texts are displayed such that the grammatical particles and the like that do not affect meaning of the speech texts are obscure and the nouns, verbs, and the like that affect the meaning of the speech text are prominent. Therefore, the meanings of the speech texts are not ruined, and it is possible to shorten time it takes the user B to read the speech texts.

<Specific Example of Editing Process Performed by Editing Unit 36>

Next, an editing process will be described. The editing process corresponds to button operation performed by a user with regard to a speech text displayed on a screen.

Figure 18:
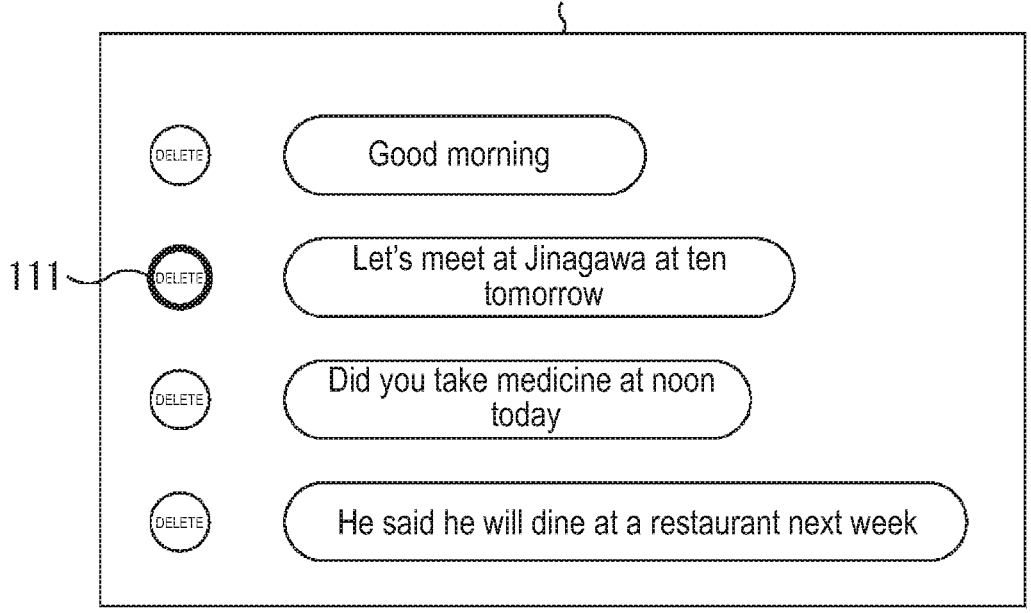
FIG. 18 is a diagram illustrating a specific example of an editing process (deletion).

FIG. 18 illustrates a display example in which delete buttons 111 are prepared in association with respective speech texts displayed on the display unit 22 for the user A. Note that, the respective speech texts illustrated in FIG. 18 correspond to the speeches of the user A illustrated in FIG. 15.

For example, in the case where the user A finds an erroneously recognized speech text as a speech recognition result of his/her speech, the user A is capable of deleting the speech text by operating the delete button 111.

In the display example illustrated in FIG. 18, a word that should be recognized as "Shinagawa" is erroneously recognized as "Jinagawa". In this case, a speech text including "Jinagawa" is deleted when the user A who has found the erroneous recognition operates the delete button 111. Subsequently, the erroneous recognition learning unit 33 learns that the speech text including "Jinagawa" is deleted (this is registered on the erroneous recognition list 34).

In other words, by operating the delete button 111, the user A is capable of deleting an erroneously recognized speech text or a speech text corresponding to a speech that has come from a slip of the tongue.

Note that, it is also possible to prepare the delete buttons 111 on the display unit 43 for the user B. In this case, for example, the user B is capable of deleting an already-read speech text by operating the delete button 111.

In the case where the user B operates the delete button 111 and the speech text is deleted, the user A is notified of the deletion. Accordingly, it is possible for the user A to confirm that the user B has already read the deleted speech text. On the other hand, in the case where the user A operates the delete button 111 and a speech text is deleted, the user B may be notified of the deletion. Such notification method may use screen display or sound output.

Figure 19:
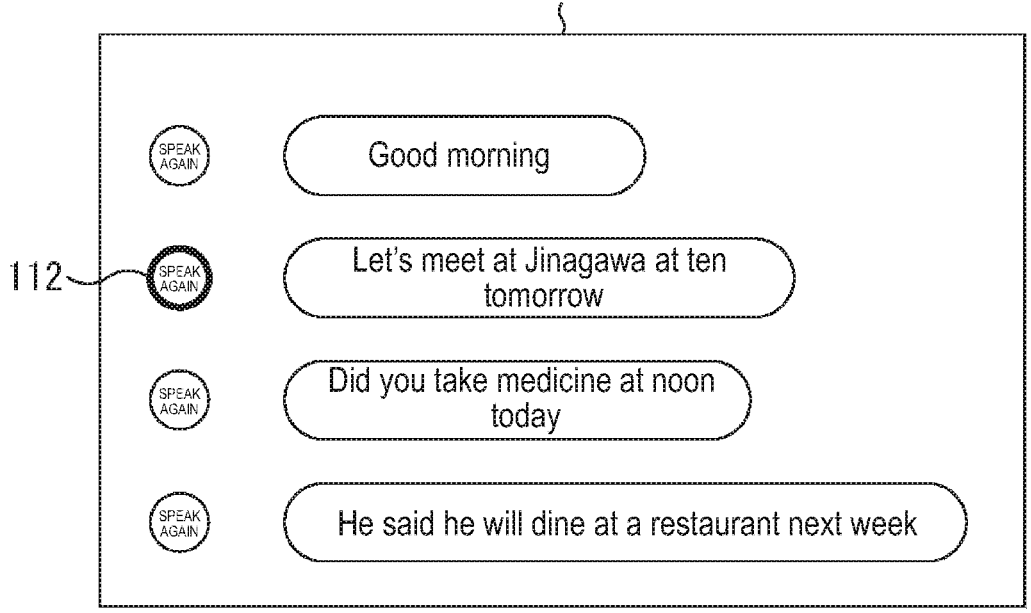
FIG. 19 is a diagram illustrating a specific example of an editing process (speaking again).

FIG. 19 illustrates a display example in which speaking-again buttons 112 are prepared in association with respective speech texts displayed on the display unit 22 for the user A. Note that, the respective speech texts illustrated in FIG. 19 correspond to the speeches of the user A illustrated in FIG. 15.

For example, in the case where the user A finds an erroneously recognized speech text as a speech recognition result of his/her speech, the user A is capable of rephrasing (saying again) the speech text by operating the speaking-again button 112.

In the display example illustrated in FIG. 19, a word that should be recognized as "Shinagawa" is erroneously recognized as "Jinagawa". In this case, the user A who has found the erroneous recognition operates the speaking-again button 112 and says, "Let's meet at Shinagawa Station at ten tomorrow" or the like again. Accordingly, the speech text "Let's meet at Jinagawa Station at ten tomorrow" that is currently displayed is replaced with a speech text obtained as a speech recognition result of the speech that is said again ("Let's meet at Shinagawa Station at ten tomorrow" if recognized correctly). In addition, the erroneous recognition learning unit 33 learns that the speech text including "Jinagawa" is replaced (this is registered on the erroneous recognition list 34).

In other words, by operating the speaking-again button 112, the user A is capable of replacing display of an erroneously recognized speech text or a speech text corresponding to a speech that has come from a slip of the tongue, with a speech text corresponding to a speech that is said again, at the same position.

Note that, although the user A says the whole speech text (in the above-described example, "let's meet ... tomorrow") again in the above-described example, it is also possible for the user A to select a word (such as "Jinagawa") and rephrase this word only.

In addition, it is also possible to prepare the speaking-again buttons 112 on the display unit 43 for the user B. In this case, a notification of prompting the user A to speak again is issued when the user B operates the speaking-again button 112. Such notification method may use screen display or sound output.

Figure 20:
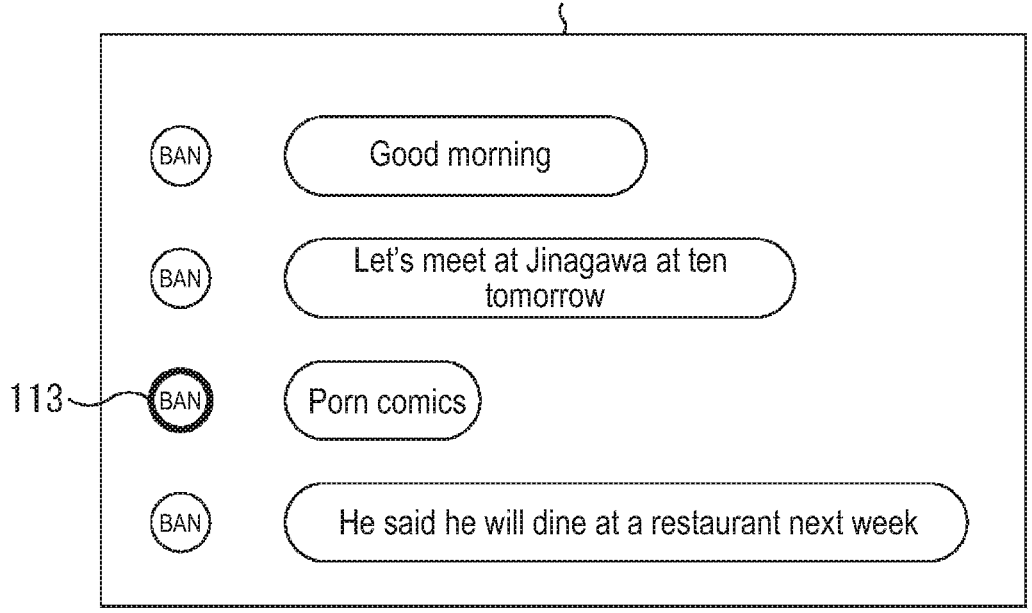
FIG. 20 is a diagram illustrating a specific example of an editing process (banned word registration).

FIG. 20 illustrates a display example in which banned-word registration buttons 113 are prepared in association with respective speech texts displayed on the display unit 22 for the user A. Note that, the respective speech texts illustrated in FIG. 20 correspond to the speeches of the user A illustrated in FIG. 15.

For example, in the case where the user A finds an erroneously recognized speech text as a speech recognition result of his/her speech and the user A do not want to let the same erroneous recognition result appear again, the user A is capable of operating the banned-word registration buttons 113 to register the erroneous recognition result as a banned word.

In the display example illustrated in FIG. 20, a certain speech of the user A is erroneously recognized as "porn comics" and the words "porn comics" are displayed. When the user A do not want to let this words appear again and operates the banned-word registration buttons 113, the displayed speech text "porn comics" is deleted and the words "porn comics" are registered by the erroneous recognition learning unit 33 as a banned word (registered on the erroneous recognition list 34).

In other words, by operating the banned-word registration button 113, the user A is capable of registering a word that comes from erroneous recognition and that the user do not want to display again, as a banned word.

Note that, it is also possible to prepare the banned-word registration buttons 113 on the display unit 43 for the user B. In this case, the user B is also capable of operating the banned-word registration button 113 to register a word that the user B do not want to display again, as a banned word.

Figure 21:
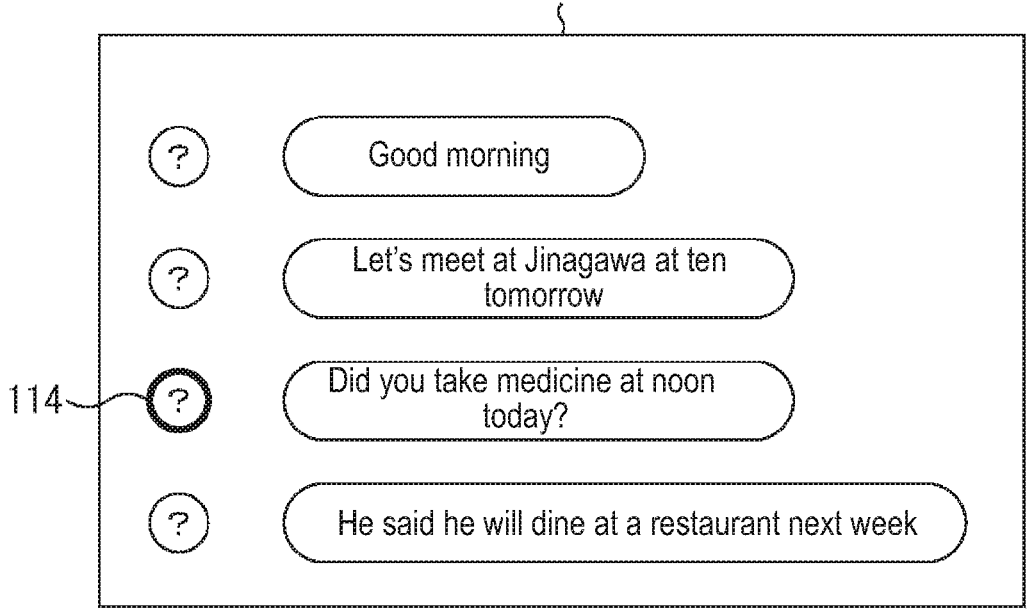
FIG. 21 is a diagram illustrating a specific example of an editing process (word addition).

FIG. 21 illustrates a display example in which word addition buttons 114 are prepared in association with respective speech texts displayed on the display unit 22 for the user A. Note that, the respective speech texts illustrated in FIG. 21 correspond to the speeches of the user A illustrated in FIG. 15.

For example, in the case where the user A thinks that it is better to add a sign "?" to the speech text obtained as a speech recognition result of his/her speech such as a question in order to increase the user B's understanding, the user A is capable of adding the sign "?" to the speech text by operating the word addition button 114.

FIG. 21 illustrates the display example after the word addition button 114 has already been operated. The sign "?" has already added to a speech text "Did you take medicine at noon today" corresponding to a speech of the user A. In this case, the addition of the sign "?" to the speech text "Did you take medicine at noon today" is registered by the word addition learning unit 37.

In other words, by operating the word addition button 114, the user A is capable of adding the sign "?" to the speech text.

In addition, it is also possible to prepare the word addition buttons 114 on the display unit 43 for the user B. In this case, the user B is capable of selecting a word or the like included in a displayed speech text, operating the word addition button 114, and asking the user A about the meaning of the word or the like, in the case where the user B does not understand the meaning of the displayed speech text or in the case where the user B wants to know more details of the contents.

Note that, the user may select a sign or the like to be added in the case where the word addition button 114 is operated such that emoji, an emoticon, a sign other than "?", or the like is added.

In the above description, the delete buttons 111, the speaking-again buttons 112, the banned-word registration buttons 113, and the word addition buttons 114 are individually displayed. However, it is also possible to display the delete buttons 111, the speaking-again buttons 112, the banned-word registration buttons 113, and the word addition buttons 114 at the same time.

Alternatively, instead of displaying the respective buttons, it is also possible to allocate predetermined touch operation (for example, tap operation, double tap operation, long tap operation, flick operation, and the like in the case where the operation input unit 23 is a touchscreen) to a deletion instruction, a speaking-again instruction, a banned-word registration instruction, and a word addition instruction. Alternatively, instead of displaying the respective buttons, it is also possible to allocate three-dimensional gesture operation performed by the user A or the user B to the deletion instruction, the speaking-again instruction, the banned-word registration instruction, and the word addition instruction. Here, the touch operation may be deemed as two-dimensional gesture operation. In addition, the three-dimensional gesture operation may be performed by using a controller included in an acceleration sensor or a gyro sensor, or may be performed by using an image recognition result of actions of the users. In this specification, sometimes the touch operation and the three-dimensional gesture operation may be simply referred to as "gesture operation".

Note that, in the case where wearable equipment, specifically, a head-mounted display is used, a nod action or a head shaking action may be allocated as gesture operation as gesture operation. In the case where the wearable equipment includes a gaze detection function, the wearable equipment may learn a physical action of the user B as gesture operation, the physical action corresponding to movement of the gaze of the user B with regard to a displayed speech text. According to such a configuration, it is possible to increase accuracy of detecting whether a user has already read a speech text on the basis of gesture operation.

Alternatively, instead of displaying the respective buttons, it is also possible to allocate predetermined magic words said by the user A or the user B to the deletion instruction, the speaking-again instruction, the banned-word registration instruction, and the word addition instruction.

In addition, it is also possible to stop displaying a speech text corresponding to a speech of the user A in the case where the user A makes a predetermined gesture allocated to the deletion instruction or saying a predetermined magic word immediately after making the speech.

Here, the stopping of display of a speech text may include stopping of display of a text that is being analyzed, in other words, stopping of a display process of a text that has not been displayed yet. In addition, in the case of stopping display of a speech text, it is also possible to analyze text information and delete a whole sentence that has been said immediately before a deletion instruction. Therefore, it is possible to cancel text information that is obtained from voice that the user A has input accidentally (such as a self-talk or a filler after). In addition, in the case where the user A makes a predetermined gesture or says a predetermined magic word representing that the user A does not input voice before speaking, the information processing unit 30 may prohibit display of the voice input immediately after the predetermined gesture or the predetermined magic word. Accordingly, it is possible for the user A to arbitrarily select a state capable of hiding a speech, and it is possible to suppress display of an unintended speech.

<Application Example of Conversation Assistance Device 10>

Next, an application example of the conversation assistance device 10 will be described.

Figure 22:
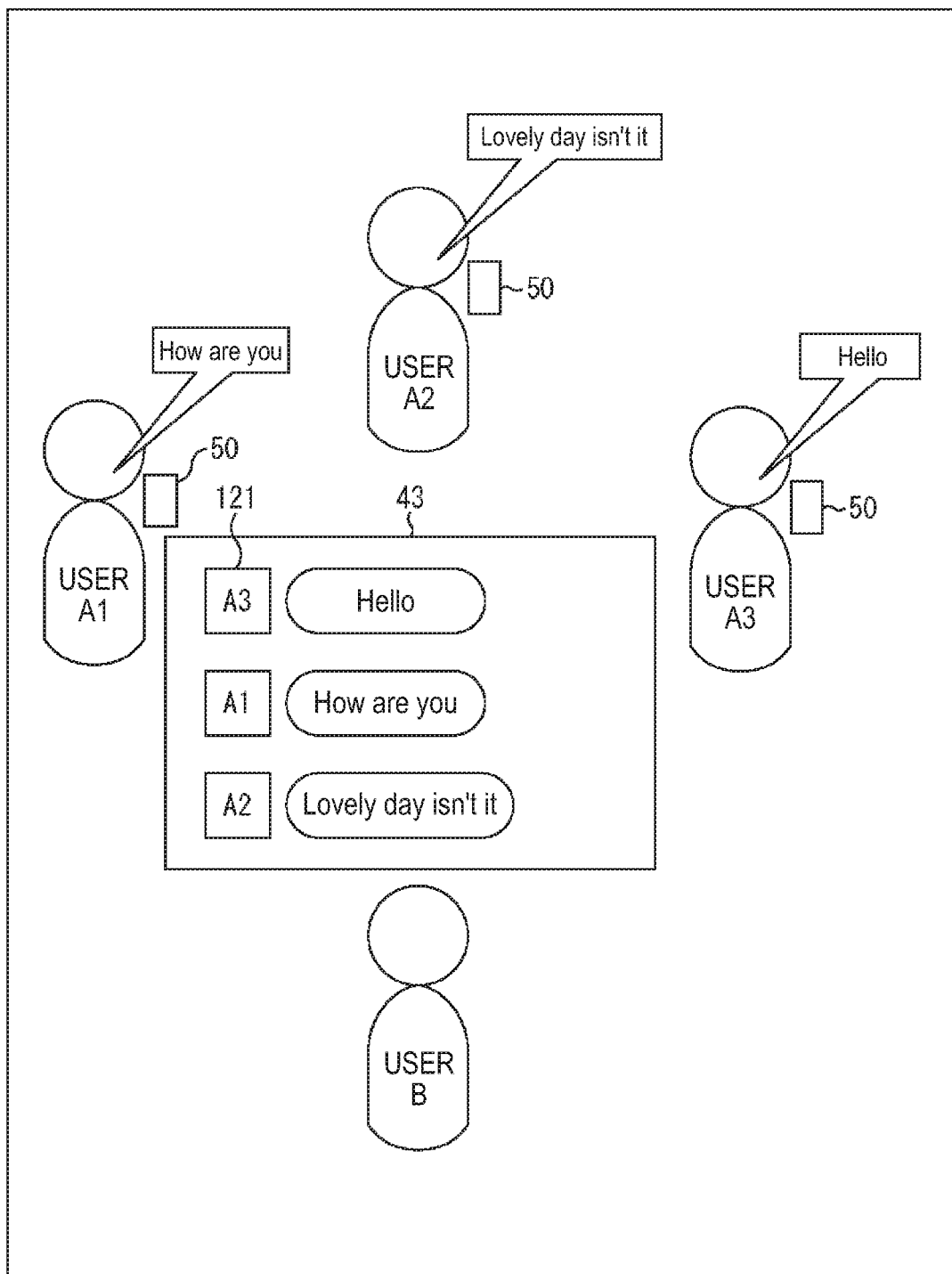
FIG. 22 is a diagram illustrating an application example of the conversation assistance device.

FIG. 22 illustrates an example of a usage condition where three or more people are allowed to use the conversation assistance device 10. In FIG. 22, the conversation assistance device 10 is used for assisting conversation between users A1, A2, and A3 who do not have difficulty in hearing, and a user B who has difficulty in hearing.

The users A1 to A3 have their own smartphones 50 for the users A. The smartphones 50 that are in a predetermined distance range are grouped, and speech texts corresponding to speeches collected by the respective smartphones 50 are collectively displayed on the display unit 43 for the user B.

Note that, for example, a method for detecting the smartphones 50 that are in the predetermined distance range is implemented such that the respective smartphones 50 output predetermined sound waves to each other and each of the smartphones 50 collects and analyzes the sound waves output from the other smartphones 50. Alternatively, for example, it is also possible to specify respective positions of the smartphones 50 by detecting the smartphones 50 from an image captured by the camera 110 that is installed on a ceiling.

The display unit 43 for the user B displays the speech texts corresponding to the speeches of the users A1 to A3 in chronological order. In addition, the display unit 43 also displays speaking-person marks 121 that represent speaking persons in association with the respective speech texts such that the user B can tell who has made each of the displayed speech texts among the users A1 to A3.

Figure 23:
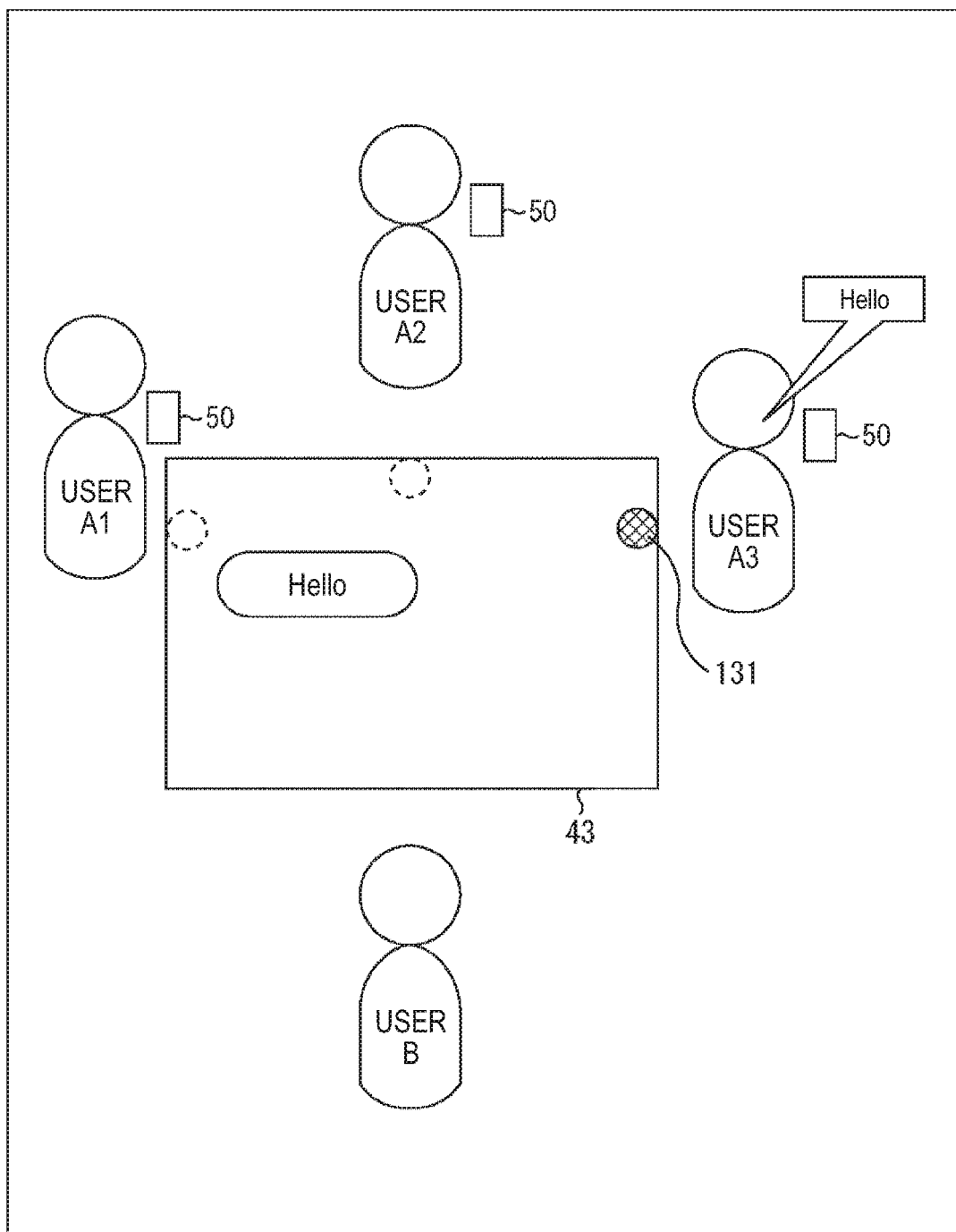
FIG. 23 is a diagram illustrating an application example of the conversation assistance device.

FIG. 23 illustrates another method of displaying speech texts in association with the users A1 to A3 such that the user B can tell who has made each of the displayed speech texts among the users A1 to A3. In FIG. 23, a speech direction indicator mark 131 is displayed on the screen. The speech direction indicator mark 131 indicates a direction of a speaking person in a state where the user B is looking at the display unit 43.

With reference to FIG. 23, a speech text corresponding to a speech of the user A3 is displayed on the screen, the user A3 being at the right side in the state where the user B is looking at the display unit 43. Therefore, the speech direction indicator mark 131 is displayed on the right side of the screen of the display unit 43.

Note that, in the state where the user B is looking at the display unit 43, it is possible to detect relative directions of the users A1, A2, and A3 from an image obtained by the camera 110 installed on a ceiling, for example.

Figure 24:
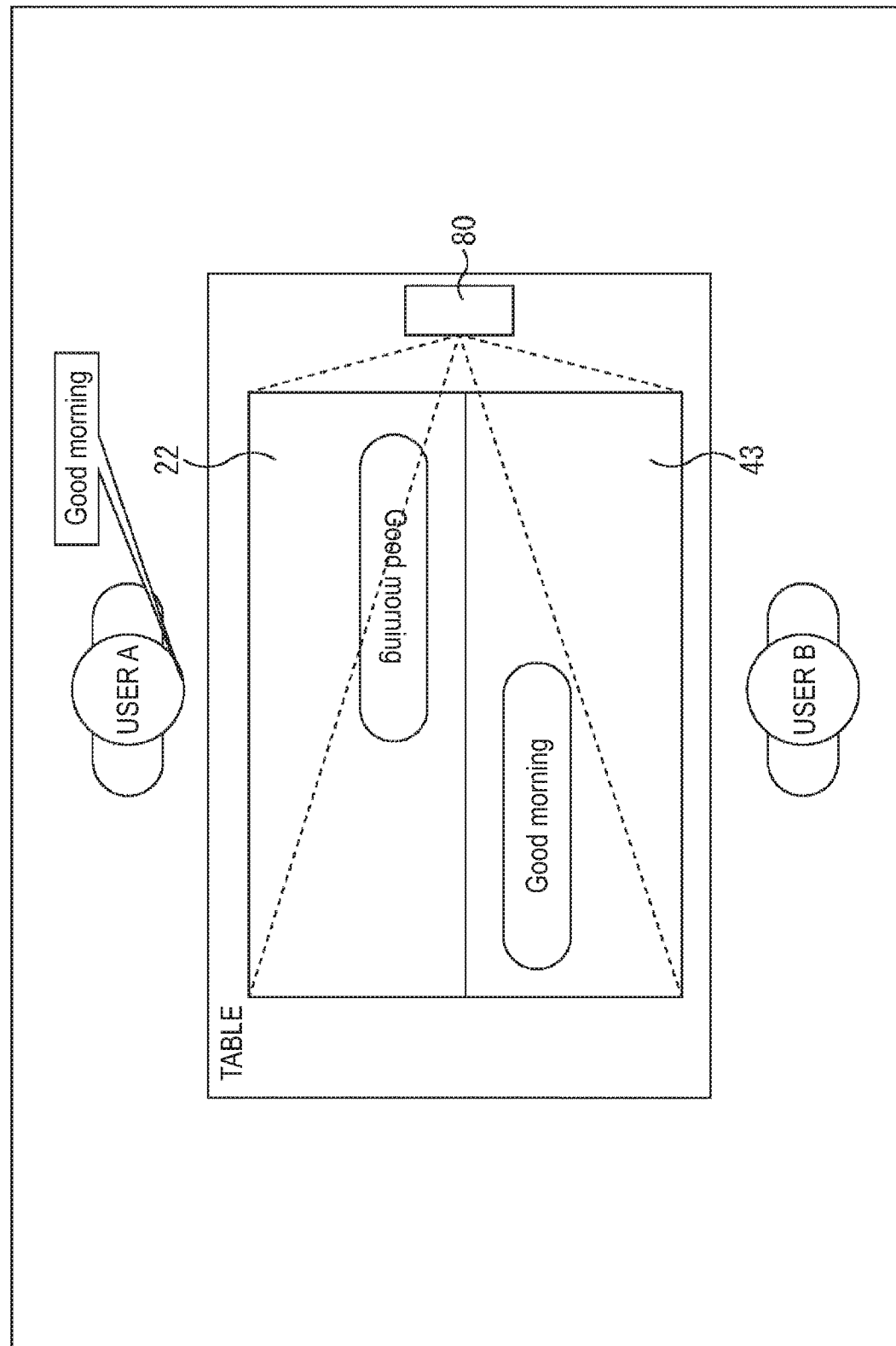
FIG. 24 is a diagram illustrating an application example of the conversation assistance device.

FIG. 24 illustrates a state where the conversation assistance device 10 is used by the user A and the user B who are facing each other across a table. In this case, the projector 80 may project the screens of the display unit 22 for the user A and the display unit 43 for the user B on the table at once. At this time, the screen of the display unit 22 for the user A is displayed such that it is easy for the user A to see the screen, and the screen of the display unit 43 for the user B is displayed such that it is easy for the user B to see the screen.

<Feedback to User A Who is Speaking Person>

Figure 25:
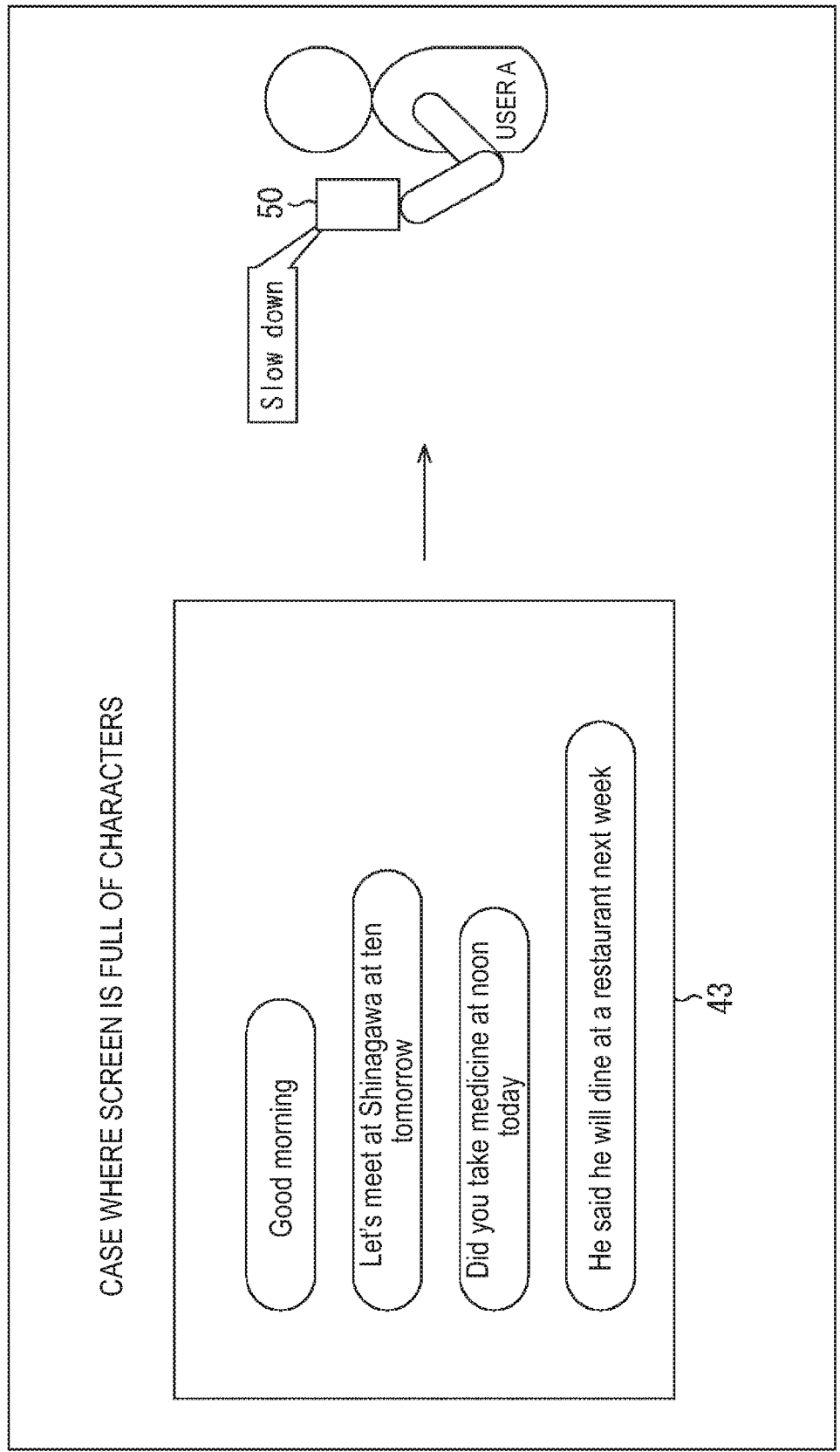
FIG. 25 is a diagram illustrating an example of giving feedback to a speaking person.

FIG. 25 illustrates an example of feedback to the user A who is a speaking person, among users who are using the conversation assistance device 10.

For example, in the case where the display of the display unit 43 is full of speech texts, feedback for instructing the user A who is a speaking person to slow down the speaking speed such as "slow down", "the screen is full", "speak slowly", "wait a moment", "put punctuation once", "you have an unread message" is given by displaying characters or outputting sound through the smartphone 50 or the like under the control of the feedback control unit 40.

Note that, it is also possible to display an indicator on a screen or output alarm sound or the like in accordance with speaking speed or length of punctuation of a speech of the user A.

In addition, in the case where the user A speaks with optimum speed and punctuation for speech recognition or screen display, points may be given to the user A and the user A may get some service benefits or may be ranked higher in accordance with the given points.

<Another Application Example>

In the above-described embodiment, the conversation assistance device 10 is used for assisting conversation between the user A who does not have difficulty in hearing and the user B who has difficulty in hearing. However, according to the present technology, it is also possible to use the conversation assistance device 10 for assisting conversation between people who use different languages from each other, for example. In this case, it is sufficient if a translation process is performed after the speech recognition process.

In addition, it is also possible for the conversation assistance device 10 to capture a moving image of a mouth of the user A when the user A is speaking, and display a speech text and the moving image of the mouth of the user A. In this case, it is possible to display the speech text and the moving image of the mouth of the user A such that the speech text and movement of the mouth are synchronized with each other. In such a way, it is possible to use the conversation assistance device 10 for learning lip reading, for example.

In addition, it is also possible for the conversation assistance device 10 to record speeches of the user A, save them in association with speech texts obtained as speech recognition results, and reproduce and display the saved results again later.

In addition, it is also possible not only to input real-time speeches of the user A to the conversation assistance device 10, but also to input recorded voice to the conversation assistance device 10.

<Example of Other Configuration of Information Processing Unit 30>

The above-described series of processes may be performed by hardware or may be performed by software. When the series of processes are performed by software, a program forming the software is installed into a computer. Examples of the computer include a computer that is incorporated in dedicated hardware and a general-purpose computer that can perform various types of function by installing various types of program. The above-described smartphone 50 according to the second configuration example corresponds to the computer.

Figure 26:
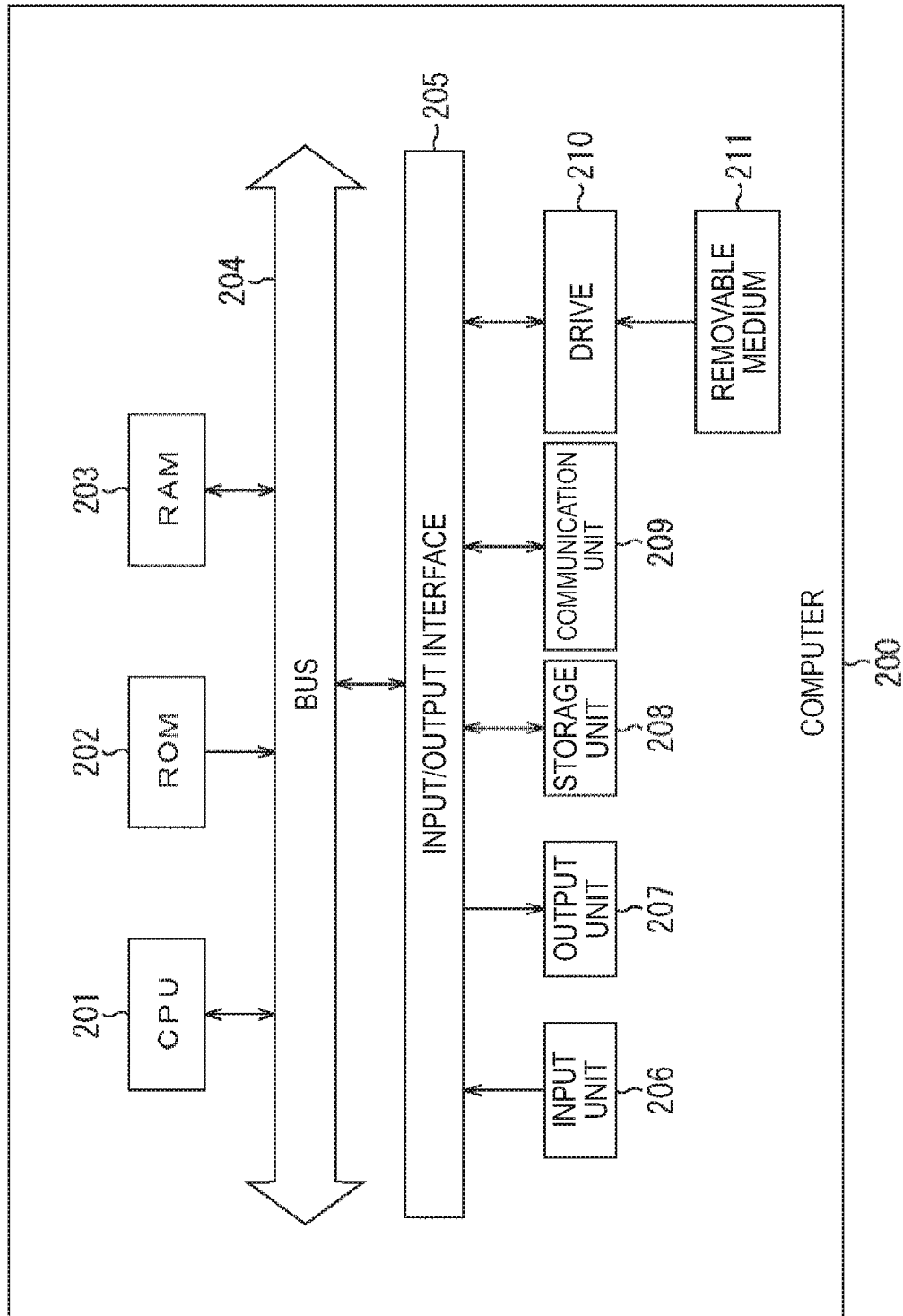
FIG. 26 is a block diagram illustrating a configuration example of a computer.

FIG. 26 is a block diagram illustrating a configuration example of the hardware of a computer that performs the above-described series of processes with a program.

In this computer 200, a central processing unit (CPU) 201, read only memory (ROM) 202, and random access memory (RAM) 203 are mutually connected by a bus 204.

Further, an input/output interface 205 is connected to the bus 204. Connected to the input/output interface 205 are an input unit 206, an output unit 207, a storage unit 208, a communication unit 209, and a drive 210.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface, and the like. The drive 210 drives a removable medium 211 such as a magnetic disk, an optical disc, a magneto-optical disk, and a semiconductor memory.

In the computer 200 configured as described above, the CPU 201 loads a program that is stored, for example, in the storage unit 208 onto the RAM 203 via the input/output interface 205 and the bus 204, and executes the program, thereby performing the above-described series of processes.

For example, programs to be executed by the computer 200 (CPU 201) can be recorded and provided in the removable medium 211, which is a packaged medium or the like. In addition, programs can be provided via a wired or wireless transmission medium such as a local area network, the Internet, and digital satellite broadcasting.

In the computer 200, by mounting the removable medium 211 onto the drive 210, programs can be installed into the storage unit 208 via the input/output interface 205. Programs can also be received by the communication unit 209 via a wired or wireless transmission medium, and installed into the storage unit 208. In addition, programs can be installed in advance into the ROM 202 or the storage unit 208.

Note that a program executed by the computer 200 may be a program in which processes are chronologically carried out in a time series in the order described herein or may be a program in which processes are carried out in parallel or at necessary timing, such as when the processes are called.

Note that, embodiments of the present disclosure are not limited to the above-described embodiments, and various alterations may occur insofar as they are within the scope of the present disclosure.

Additionally, the present technology may also be configured as below.

(1)

An information processing device including:

a sound acquisition unit configured to acquire sound information of a first user that is input to a sound input device; and a display control unit configured to control display of text information on a display device for a second user, the text information corresponding to the acquired sound information, in which the display control unit performs control related to display amount of the text information on the basis of at least one of the display amount of the text information on the display device or input amount of the sound information input through the sound input device.

(2)

The information processing device according to (1), in which the display control unit reduces the display amount of the text information in a case where the display amount of the text information is a predetermined amount or more.

(3)

The information processing device according to (1) or (2), in which the display control unit reduces the display amount of the text information by reducing display amount of a predetermined part of speech included in the text information.

(4)

The information processing device according to any one of (1) to (3), in which the display control unit reduces the display amount of the text information on the basis of predetermined operation performed by the first user or the second user.

(5)

The information processing device according to (4), in which the predetermined operation includes first operation performed by the first user or the second user, and the display control unit reduces the display amount of the text information and then causes the display of the text information to be deleted on the basis of the first operation.

(6)

The information processing device according to (5), in which the predetermined operation includes second operation performed by the first user or the second user, and the display control unit causes the display of the text information to be deleted and then causes the deleted text information to be displayed again on the display device on the basis of the second operation.

(7)

The information processing device according to any one of (1) to (6), in which the display control unit controls at least one of a newline or a page break with regard to the display of the text information in accordance with an analysis result of the text information.

(8)

The information processing device according to any one of (1) to (7), further including a notification unit configured to notify one of the first user and the second user of information indicating that operation related to the text information has been performed, in a case where the other of the first user and the second user has performed the operation related to the text information.

(9)

The information processing device according to (8), in which the notification unit notifies one of the first user and the second user that the display amount of the text information has been reduced, in a case where the other of the first user and the second user has performed operation of reducing the display amount of the text information.

(10)

The information processing device according to (8) or (9), in which the notification unit notifies one of the first user and the second user that the display of the text information has been deleted, in a case where the other of the first user and the second user has performed operation of deleting the display of the text information.

(11)

The information processing device according to any one of (8) to (10), in which the notification unit issues a notification that prompts the first user to speak again in a case where the second user has performed operation of requesting to speak the text information displayed on the display device again.

(12)

The information processing device according to any one of (8) to (11), in which the notification unit notifies the first user that an inquiry about the text information is received in a case where the second user has performed operation of making the inquiry about the text information displayed on the display device.

(13)

The information processing device according to any one of (1) to (12), in which the display control unit reduces the display amount of the text information on the display device on the basis of a detection result of whether the second user has already read the text information, the detection result being based on at least one of a voice or an action of the second user.

(14)

The information processing device according to any one of (1) to (13), in which the display control unit stops displaying the text information on the display device on the basis of at least one of a voice or an action of the first user.

(15)

The information processing device according to any one of (1) to (14), further including a feedback control unit configured to control a notification of feedback information to at least one of the first user or the second user on the basis of at least one of the display amount of the text information on the display device or the input amount of the sound information.

(16)

The information processing device according to (15), in which the feedback information is information that prompts the first user to change at least one of speech speed or speech punctuation.

(17)

The information processing device according to (15) or (16), in which the feedback information is information that prompts the second user to read the text information displayed on the display device.

(18)

The information processing device according to any one of (1) to (17), further including a speech recognition unit configured to convert the sound information of the first user into the text information, in which the speech recognition unit is installed in the information processing device or installed on a server that is connected via the Internet.

(19)

An information processing method of an information processing device, the information processing method including:

a sound acquisition step of acquiring, by the information processing device, sound information of a first user that is input to a sound input device; and a display control step of controlling, by the information processing device, display of text information on a display device for a second user, the text information corresponding to the acquired sound information, in which, in the display control step, control related to display amount of the text information is performed on the basis of at least one of the display amount of the text information on the display device or input amount of the sound information input through the sound input device.

(20)

An information processing system including:

a sound input device configured to acquire sound information of a first user;

a display control device configured to control display of text information corresponding to the acquired sound information; and a display device configured to display the text information for a second user under the control of the display control device, in which the display control device performs control related to display amount of the text information on the basis of at least one of the display amount of the text information on the display device or input amount of the sound information input through the sound input device.

REFERENCE SIGNS LIST 10 conversation assistance device
21 sound collection unit
22 display unit
23 operation input unit
30 information processing unit
31 speech recognition unit
32 image recognition unit
33 erroneous recognition learning unit
34 erroneous recognition list
35 analysis unit
36 editing unit
37 word addition learning unit
38 display waiting list holding unit
39 display control unit
40 feedback control unit
41 image capturing unit
42 sound collection unit
43 display unit
44 operation input unit
50 smartphone
60 tablet PC
80 projector
90 TV
100 neckband microphone
110 camera
111 delete button
112 speaking-again button
113 banned-word registration buttons 113
114 word addition button
200 computer
201 CPU

The invention claimed is:

1. An information processing device, comprising:
   circuitry configured to:
   acquire sound information of a first user from a sound input device, wherein the sound information is input to the sound input device;
   control display of text information on a display device for a second user, wherein the text information corresponds to the acquired sound information;
   perform control related to display amount of the text information based on at least one of the text information on the display device or amount of the sound information; and
   control a notification of feedback information to at least one of the first user or the second user, wherein the notification of the feedback information is controlled based on the display amount of the text information.

2. The information processing device according to claim 1, wherein the circuitry is further configured to reduce the display amount of the text information based on the display amount of the text information that is equal to or greater than a threshold amount.

3. The information processing device according to claim 2, wherein the circuitry is further configured to reduce the display amount of the text information based on reduction of display amount of a part of speech included in the text information.

4. The information processing device according to claim 2, wherein the circuitry is further configured to reduce the display amount of the text information based on a specific operation from the at least one of the first user or the second user.

5. The information processing device according to claim 4, wherein
   the specific operation includes a first operation from at least one of the first user or the second user, and
   the circuitry is further configured to delete the text information based on the first operation.

6. The information processing device according to claim 5, wherein
   the specific operation includes a second operation from at least one of the first user or the second user, and
   the circuitry is further configured to control display of the deleted text information based on the second operation.

7. The information processing device according to claim 2, wherein
   the circuitry is further configured to control display of at least one of a newline or a page break associated with the text information, and
   the display of the at least one of the newline or the page break is controlled based on an analysis result of the text information.

8. The information processing device according to claim 1, wherein the circuitry is further configured to:
   determine a first operation related to the text information from the at least one of the first user or the second user; and
   notify first notification information based on the first operation, wherein
   the first notification information is notified to at least one of the first user or the second user, and
   the first notification information indicates information of the first operation related to the text information.

9. The information processing device according to claim 8, wherein the circuitry is further configured to:
   reduce the display amount of the text information based on a second operation from the at least one of the first user or the second user; and
   notify second notification information to the at least one of the first user or the second user, wherein the second notification information indicates a reduction of the display amount of the text information.

10. The information processing device according to claim 8, wherein the circuitry is further configured to:
    delete the text information based on a second operation from the at least one of the first user or the second user; and
    notify second notification information to the at least one of the first user or the second user, based on the deleted text information, wherein the second notification information indicates the deletion of the text information.

11. The information processing device according to claim 8, wherein the circuitry is further configured to:
    acquire a second operation from the second user, wherein the second operation includes a request to repeat display of the text information; and
    notify second notification information that prompts the first user to speak again, wherein the second notification information is based on the second operation from the second user.

12. The information processing device according to claim 8, wherein the circuitry is further configured to:
    acquire, from the second user, an inquiry related to the text information; and
    notify second notification information to the first user based on the acquired inquiry.

13. The information processing device according to claim 1, wherein
    the circuitry is further configured to reduce the display amount of the text information based on a detection result,
    the detection result indicates that the second user has read the text information, and
    the detection result is based on at least one of a voice or an action of the second user.

14. The information processing device according to claim 1, wherein the circuitry is further configured to stop the display of the text information based on at least one of a voice or an action of the first user.

15. The information processing device according to claim 1, wherein the feedback information prompts the first user to change at least one of a speech speed or a speech punctuation.

16. The information processing device according to claim 1, wherein the feedback information prompts the second user to read the text information displayed on the display device.

17. The information processing device according to claim 1, wherein the circuitry is further configured to convert the sound information of the first user into the text information.

18. An information processing method, comprising:
    in an information processing device:
    acquiring sound information of a first user from a sound input device, wherein the sound information is input to the sound input device;
    display of text information on a display device for a second user, wherein the text information corresponds to the acquired sound information;
    performing control related to display amount of the text information based on at least one of the text information on the display device or amount of the sound information; and controlling a notification of feedback information to at least one of the first user or the second user, wherein the notification of the feedback information is controlled based on the display amount of the text information.

19. An information processing system, comprising:
a microphone configured to acquire sound information of a first user;
a display device; and
circuitry configured to:
control display of text information on the display device for a second user, wherein the text information corresponds to the acquired sound information of the first user;
perform control related to display amount of the text information based on at least one of the text information on the display device or amount of the sound information; and
control a notification of feedback information to at least one of the first user or the second user, wherein the notification of the feedback information is controlled based on the display amount of the text information.

\* \* \* \* \*